(12) United States Patent
Cambor

(10) Patent No.: US 10,248,847 B2
(45) Date of Patent: Apr. 2, 2019

(54) PROFILE INFORMATION IDENTIFICATION

(71) Applicant: Accenture Global Solutions Limited, Dublin (IE)

(72) Inventor: Wendy Cambor, New York, NY (US)

(73) Assignee: Accenture Global Solutions Limited, Dublin (IE)

( * ) Notice: Subject to any disclaimer, the term of this patent is extended or adjusted under 35 U.S.C. 154(b) by 142 days.

(21) Appl. No.: 15/429,854

(22) Filed: Feb. 10, 2017

(65) Prior Publication Data
US 2018/0232562 A1 Aug. 16, 2018

(51) Int. Cl.
*G06K 9/00* (2006.01)
*H04L 29/08* (2006.01)

(52) U.S. Cl.
CPC ..... *G06K 9/00288* (2013.01); *G06K 9/00281* (2013.01); *H04L 67/306* (2013.01); *G06K 2209/27* (2013.01); *H04L 67/10* (2013.01)

(58) Field of Classification Search
CPC ........... G06K 9/00677; G06K 9/00221; G06K 9/00295; G06K 9/00288; G06K 9/00228; H04L 67/306; H04L 67/10
See application file for complete search history.

(56) References Cited

U.S. PATENT DOCUMENTS

| | | | |
|---|---|---|---|
| 9,253,266 B2 | 2/2016 | Colangelo | |
| 9,668,023 B1* | 5/2017 | Twyman | H04N 21/4788 |
| 2012/0294495 A1 | 11/2012 | Wren et al. | |
| 2013/0077835 A1 | 3/2013 | Kritt et al. | |
| 2013/0156274 A1 | 6/2013 | Buchmueller et al. | |
| 2013/0287269 A1* | 10/2013 | Gossweiler | G06K 9/62 382/118 |
| 2014/0294257 A1* | 10/2014 | Tussy | G06F 17/30247 382/118 |
| 2017/0104957 A1* | 4/2017 | Farrell | H04L 65/403 |

* cited by examiner

*Primary Examiner* — Ali Bayat
(74) *Attorney, Agent, or Firm* — Harrity & Harrity, LLP

(57) ABSTRACT

A device may store images of people and profile information associated with the images of the people, and may generate configuration information associated with providing customized profile information to a user device. The device may receive an image, of a person, captured by the user device, and may perform facial recognition of the image of the person to generate facial features of the person. The device may compare the facial features of the person and the images of the people, and may identify a stored image of the person, from the images of the people, based on comparing the facial features of the person and the images of the people. The device may determine, from the profile information and based on the configuration information, particular profile information that corresponds to the stored image of the person, and may provide the particular profile information to the user device.

20 Claims, 22 Drawing Sheets

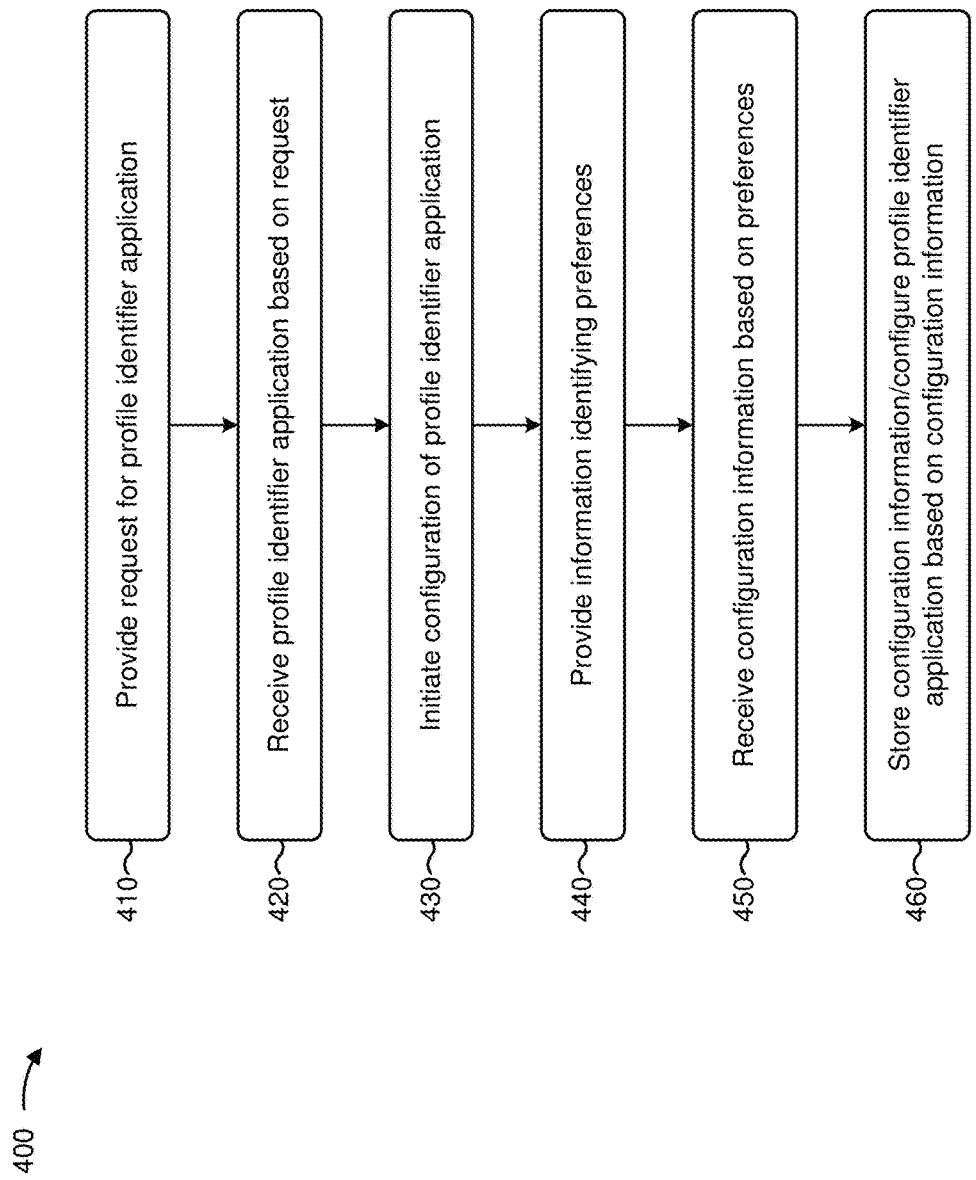

FIG. 5A

Profile Identifier Application

BIOGRAPHY LOCATION(S)
(Select all that apply)

☐ LinkedIn   ☐ Google+

☐ Facebook   ☐ Local Memory

TARGET PEOPLE
(Prioritize and remove as necessary)

| Recruiting Candidates | ▲ | ③ |
| Target Clients | ▲ | ② |
| Vendors | ▲ | ④ |
| People I Know | ▲ | ① |

(Back)   (More Configurations)   (Submit)

FIG. 5B

Profile Identifier Application

BIOGRAPHY LOCATION(S)
(Select all that apply)

☐ LinkedIn    ☐ Google+
☐ Facebook    ☐ Local Memory

TARGET PEOPLE
(Prioritize and remove as necessary)

▶ Recruiting Candidates    ③
  ○ Attorneys
  ○ Engineering Degree
  ○ Former Patent Examiner
  ○ Marketing Degree
▲ Target Clients    ②
▲ Vendors    ④
▲ People I Know    ①

Pulldown Menu of Traits

Click to List (Recruiting Candidates)
Click to List (Target Clients, Vendors, People I Know)

( Back )  ( More Configurations )  ( Submit )

FIG. 5C

PROFILE INFORMATION IDENTIFICATION

BACKGROUND

An individual contact profile provided on a user device (e.g., a smartphone) may include personal data, such as a name, an image, an email address, an email account identifier, a company name, a job title, social media account information, or the like associated with an individual contact. In some instances, a user of the user device may encounter a person (e.g., sees the person at a meeting, is introduced to the person, or the like) that the user has never encountered or has met before but cannot remember. In such instances, the user device may not include any information about the person, and the user may attempt to identify the person and obtain information about the person, with the user device, by searching the Internet for information about the person. However, without adequate clues about the identity of the person (e.g., a name tag on the person, an attendee list at a meeting, or the like), identification of the person is almost impossible.

SUMMARY

In some possible implementations, a device may include one or more processors to store images of people and profile information associated with the images of the people, and generate configuration information associated with providing customized profile information to a user device. The configuration information may be generated based on preferences, received from the user device, that specify information to be provided in the customized profile information. The one or more processors may receive an image, of a person, captured by the user device, may perform facial recognition of the image of the person to generate facial features of the person, and may compare the facial features of the person and the images of the people. The one or more processors may also identify a stored image of the person, from the images of the people, based on comparing the facial features of the person and the images of the people, may determine, from the profile information associated with the images of the people, particular profile information that corresponds to the stored image of the person, the particular profile information being determined based on the configuration information, and may provide the particular profile information to the user device.

In some possible implementations, a non-transitory computer-readable medium may store instructions that include one or more instructions that, when executed by one or more processors, cause the one or more processors to: generate configuration information associated with providing customized profile information to a user device, the configuration information being generated based on preferences, received from the user device, that specify information to be provided in the customized profile information; receive a video, of a person, obtained by the user device; perform facial recognition on the video of the person to identify facial features of the person; compare the facial features of the person and stored images of people; identify a stored image of the person, from the stored images of the people, based on comparing the facial features of the person and the stored images of the people; determine, from profile information associated with the stored images of the people, particular profile information that corresponds to the stored image of the person, the particular profile information being determined based on the configuration information; and provide the particular profile information to the user device, the particular profile information causing the user device to display the particular profile information with the video of the person or a frame of the video of the person.

In some possible implementations, a method may include generating, by a device, configuration information associated with providing customized profile information to a user device, the configuration information being generated based on preferences, received from the user device, that specify information to be provided in the customized profile information. The method may also include receiving, by the device, an image, of a person, captured by the user device, performing, by the device, facial recognition of the image of the person to identify facial features of the person, and comparing, by the device, the facial features of the person and stored images of people. The method may include identifying, by the device, a stored image of the person, from the stored images of the people, based on comparing the facial features of the person and the stored images of the people, and determining, by the device and from profile information associated with the stored images of the people, particular profile information that corresponds to the stored image of the person, the particular profile information being determined based on the configuration information. The method may include providing, by the device, the particular profile information to the user device.

In some possible implementations, a user device may include one or more processors to provide, to a device, preferences that specify information to be provided in customized profile information generated by the device, and receive, from the device, configuration information associated with the customized profile information. The one or more processors may receive an image of a person, and may provide the image of the person to the device to cause the device to identify a stored image of the person, from stored images of the people, based on comparing facial features of the person and the stored images of the people, and determine particular profile information that corresponds to the stored image of the person, the particular profile information to be determined based on the configuration information. The one or more processors may receive the particular profile information from the device, and may provide the particular profile information for display.

BRIEF DESCRIPTION OF THE DRAWINGS

FIG. 4 is a flow chart of an example process for receiving and configuring a profile identifier application for a user device;

FIGS. 5A-5C are diagrams of example user interfaces that may be used in connection with the example process shown in FIG. 4;

DETAILED DESCRIPTION

The following detailed description of example implementations refers to the accompanying drawings. The same reference numbers in different drawings may identify the same or similar elements.

Some services automatically connect email accounts, calendars, and social media accounts associated with a user of a user device. However, such services do not enable the user to obtain profile information about a person based on a captured image and/or video of the person.

In systems and/or methods described herein, a user device may capture an image and/or video of a person (e.g., at a meeting, a conference, or the like), may identify profile information for the person (e.g., obtained from social media profiles, such as LinkedIn profiles, Twitter profiles, Facebook profiles, Google+ profiles, or the like) based on facial recognition of the captured image/video, and may present the profile information on the user device. The profile information may be utilized to identify the person in the captured image/video and/or to create a custom profile of the person for storage by the user device.

By capturing images/video of people in this way, the user device quickly and easily provides profile information to the user of the user device about people that the user may know, about people that the user does not know, about people from target clients of the user, about people that the user may wish to employ, or the like. The profile information may be used to connect with people via social media, to connect with people at a conference or a meeting, to provide ice breaker information for people, or the like.

Figure 1A:
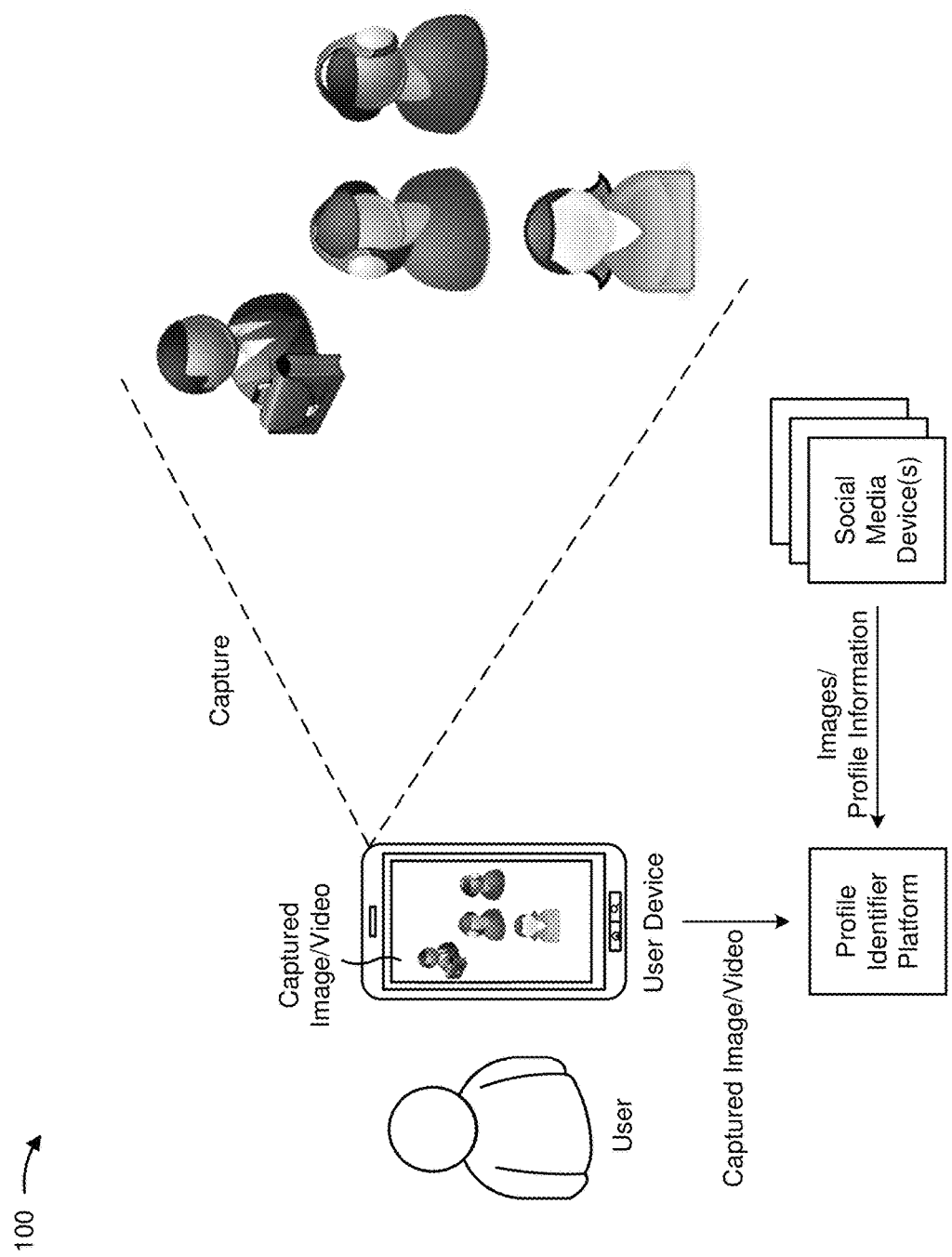
FIGS. 1A-1C are diagrams of an overview of an example implementation described herein.
Figure 1B:
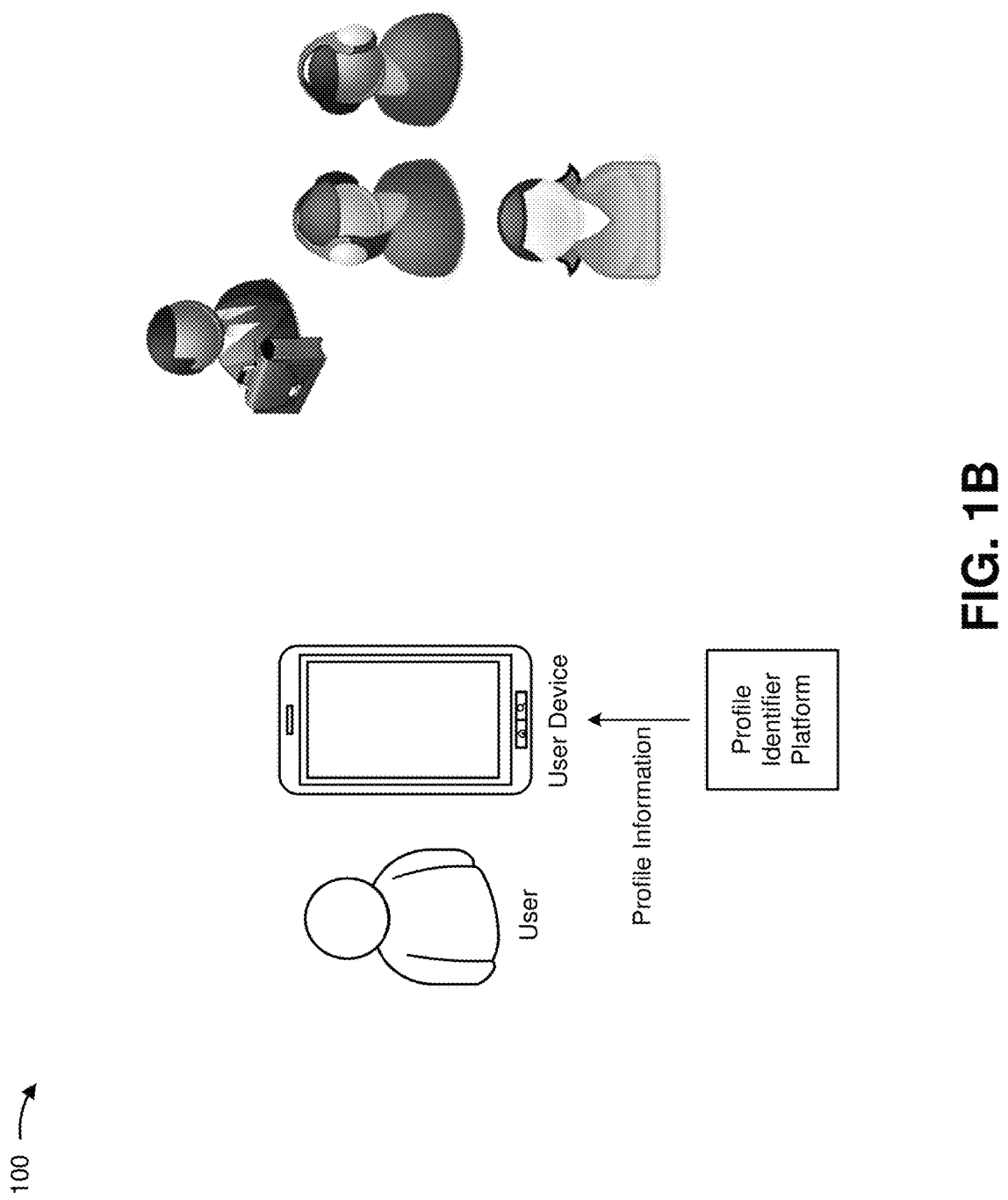
Figure 1C:
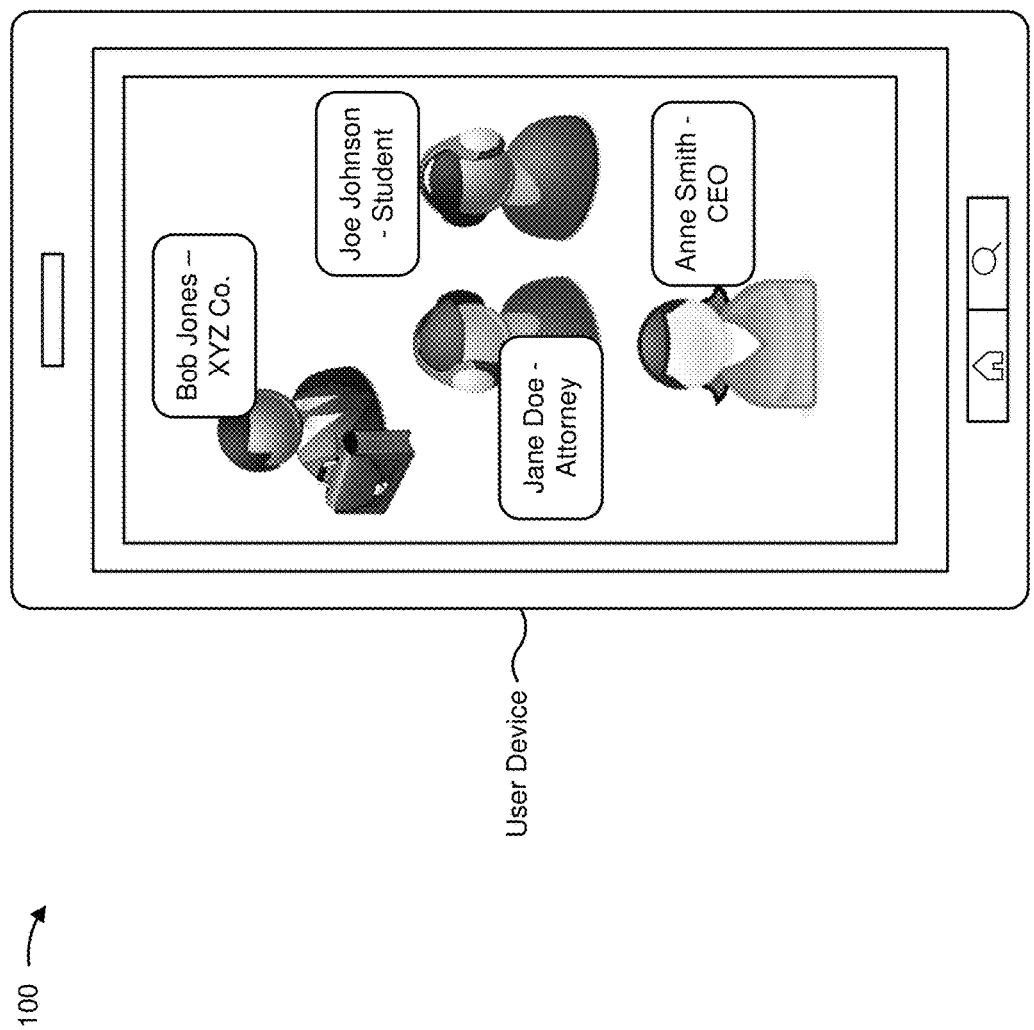

FIGS. 1A-1C are diagrams of an overview of an example implementation 100 described herein. As shown in FIG. 1A, assume that a user is associated with a user device (e.g., a smartphone, a tablet computer, or the like) that may communicate with a profile identifier platform and social media devices (e.g., devices associated with social media websites). Further assume that the user is at a conference and wishes to meet new people at the conference. As further shown in FIG. 1A, the user may utilize the user device to capture an image and/or a video of some people at the conference. The user device may provide the captured image/video to the profile identifier platform. As further shown in FIG. 1A, the profile identifier platform may receive and/or obtain, from the social media devices, images and profile information associated with social media profiles maintained by the social media devices. The profile identifier platform may store the images and profile information.

The profile identifier platform may perform facial recognition on the captured image/video of the people, and may compare information obtained from the facial recognition and the stored images and profile information (e.g., obtained from the social media devices). The profile identifier platform may identify stored images of people, which match the people in the captured image/video, based on the comparison. The profile identifier platform may determine profile information that corresponds to the identified stored images. The profile information may include, for example, names, email addresses, email account identifiers, company names, job titles, social media information, or the like associated with the people in the captured image/video. As shown in FIG. 1B, the profile identifier platform may provide profile information to the user device.

As shown in FIG. 1C, the user device may display the profile information with the captured image/video of the people. For example, the user device may display profile information associated with a particular person with the captured image/video of the particular person. As shown in FIG. 1C, the user device may display first profile information (e.g., Bob Jones, XYZ Co.) in connection with a first person in the captured image/video, second profile information (e.g., Joe Johnson, student) in connection with a second person in the captured image/video, third profile information (e.g., Jane Doe, Attorney) in connection with a third person in the captured image/video, and fourth profile information (e.g., Anne Smith, CEO) in connection with a fourth person in the captured image/video.

By identifying profile information based on captured images, videos, and/or lists of people, the user device quickly and easily provides information to the user of the user device about people that the user may know, about people that the user does not know, about target clients of the user, and/or about people that the user may wish to employ, which conserves processing resources of the user device over a situation where the user device is used to search for information about the people. The profile information may be used to connect with people via social media, to connect with people at a conference or a meeting, to provide ice breaker information for people, or the like. Such an arrangement may conserve or save processing resources associated with the user device since the identification of the profile information may be performed by the profile identifier platform rather than the user device (e.g., via searching of the Internet).

As indicated above, FIGS. 1A-1C are provided merely as an example. Other examples are possible and may differ from what was described with regard to FIGS. 1A-1C.

Figure 2:
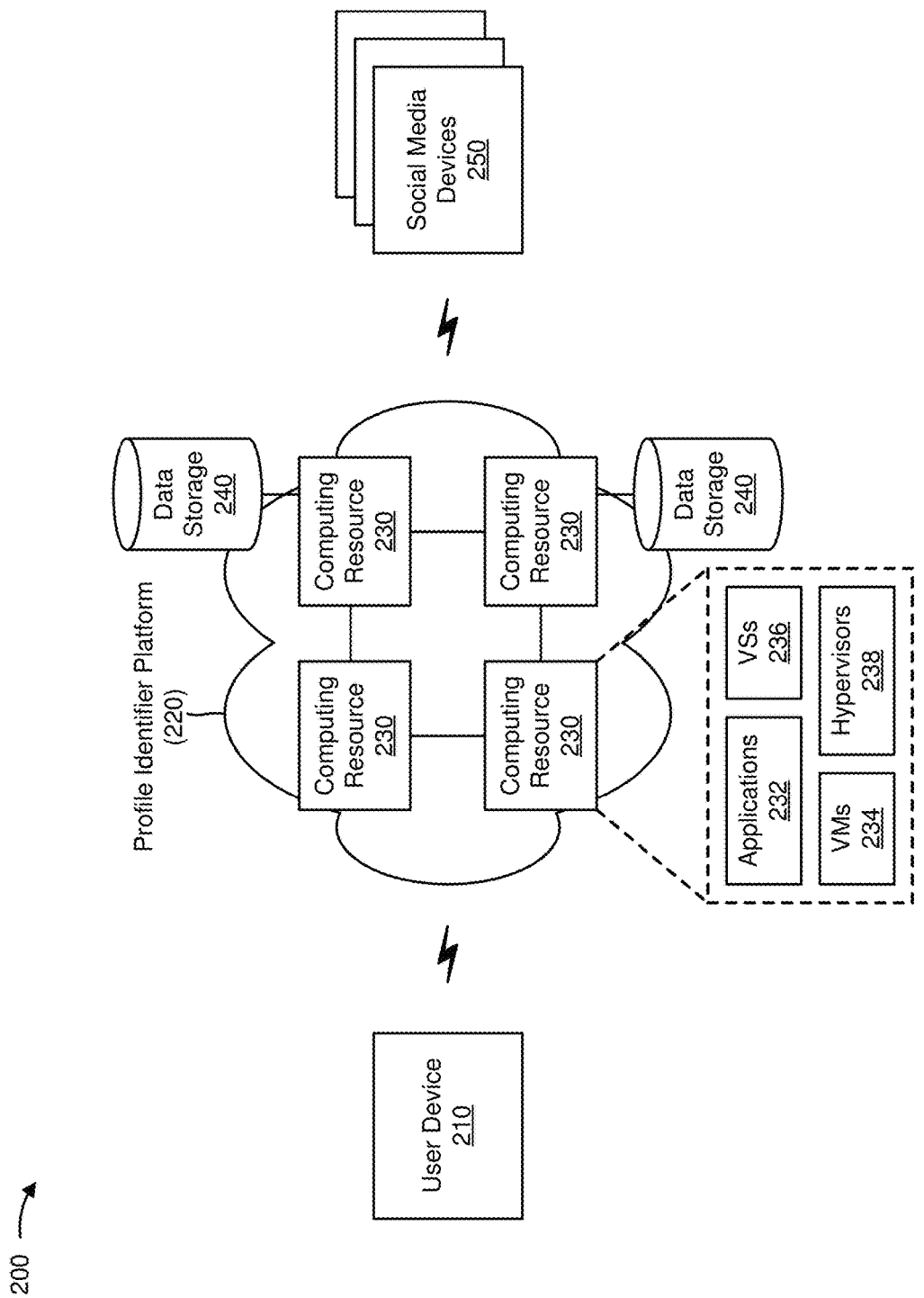
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a profile identifier platform 220, and social media devices 250 (referred to collectively as "social media devices 250," and individually as "social media device 250"). As further shown in FIG. 2, profile identifier platform 220 may include computing resources 230 (referred to collectively as "computing resources 230," and individually as "computing resource 230"), which may include or be associated with applications 232, virtual machines (VMs) 234, virtualized storage (VSs) 236, hypervisors 238, and data storage 240. Devices of environment 200 may interconnect via wired connections, wireless connections, or a combination of wired and wireless connections.

User device 210 may include devices capable of receiving, generating, storing, processing, and/or providing information, such as information described herein. For example, user device 210 may include a device, such as a mobile phone (e.g., a smart phone, a radiotelephone, or the like), a laptop computer, a tablet computer, a handheld computer, a gaming device, a wearable communication device (e.g., a smart wristwatch, a pair of smart eyeglasses, a camera, or the like), or a similar type of device. In some implementations, user device 210 may receive information from and/or transmit information to another device in environment 200, such as profile identifier platform 220 and/or social media devices 250.

Profile identifier platform 220 may include an environment that delivers computing as a service, whereby shared resources, services, etc. may be provided to user device 210. Profile identifier platform 220 may provide computation, software, data access, storage, etc. services that do not require end-user (e.g., user device 210) knowledge of a physical location and configuration of system(s) and/or device(s) that deliver the services. In some implementations, profile identifier platform 220 may include cloud-based resources (e.g., computing resources 230), one or more server devices, data center resources, or a combination of cloud-based resources, server devices, and/or data center resources.

Computing resource 230 may include personal computers, workstation computers, server devices, or other types of computation and communication devices. In some implementations, computing resource 230 may provide cloud resources to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections. In some implementations, computing resources 230 may communicate via a network, such as a local area network (LAN), a wide area network (WAN), a metropolitan area network (MAN), a telephone network, such as the Public Switched Telephone Network (PSTN) or a cellular network, an intranet, the Internet, a fiber optic network, or a combination of networks.

Application 232 may include software applications that may be provided to or accessed by user device 210. Application 232 may eliminate a need to install and execute the software applications on user device 210. For example, application 232 may include word processing software, database software, monitoring software, financial software, communication software, image processing software, facial recognition software, and/or any other software capable of being provided via profile identifier platform 220. In some implementations, one application 232 may send/receive information to/from other applications 232, via virtual machine 234.

Virtual machine 234 may include a software implementation of a physical machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage infrastructure of profile identifier platform 220, such as data management, synchronization, and long-duration data transfers.

Virtualized storage 236 may include storage systems and/or devices that use virtualization techniques to enable functionality and advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how storage is managed for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by profile identifier platform 220.

Data storage 240 may include storage devices that store information in data structures, such as databases, tables, lists, trees, indices, etc. In some implementations, data storage 240 may store information, such as images of people obtained from social media devices 250, images or people obtained from other sources (e.g., the Internet, an organization database, an organization website, or the like), profile information obtained from social media devices 250, profile information obtained from the other sources, or the like.

Social media device 250 includes a device capable of receiving, generating, storing, processing, and/or providing information, such as information described herein. For example, social media device 250 may include a computing device, such as a server device or a group of server devices. In some implementations, social media device 250 may receive information from and/or transmit information to user device 210 and/or profile identifier platform 220.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., devices) of environment 200 may perform functions described as being performed by another set of devices of environment 200.

Figure 3:
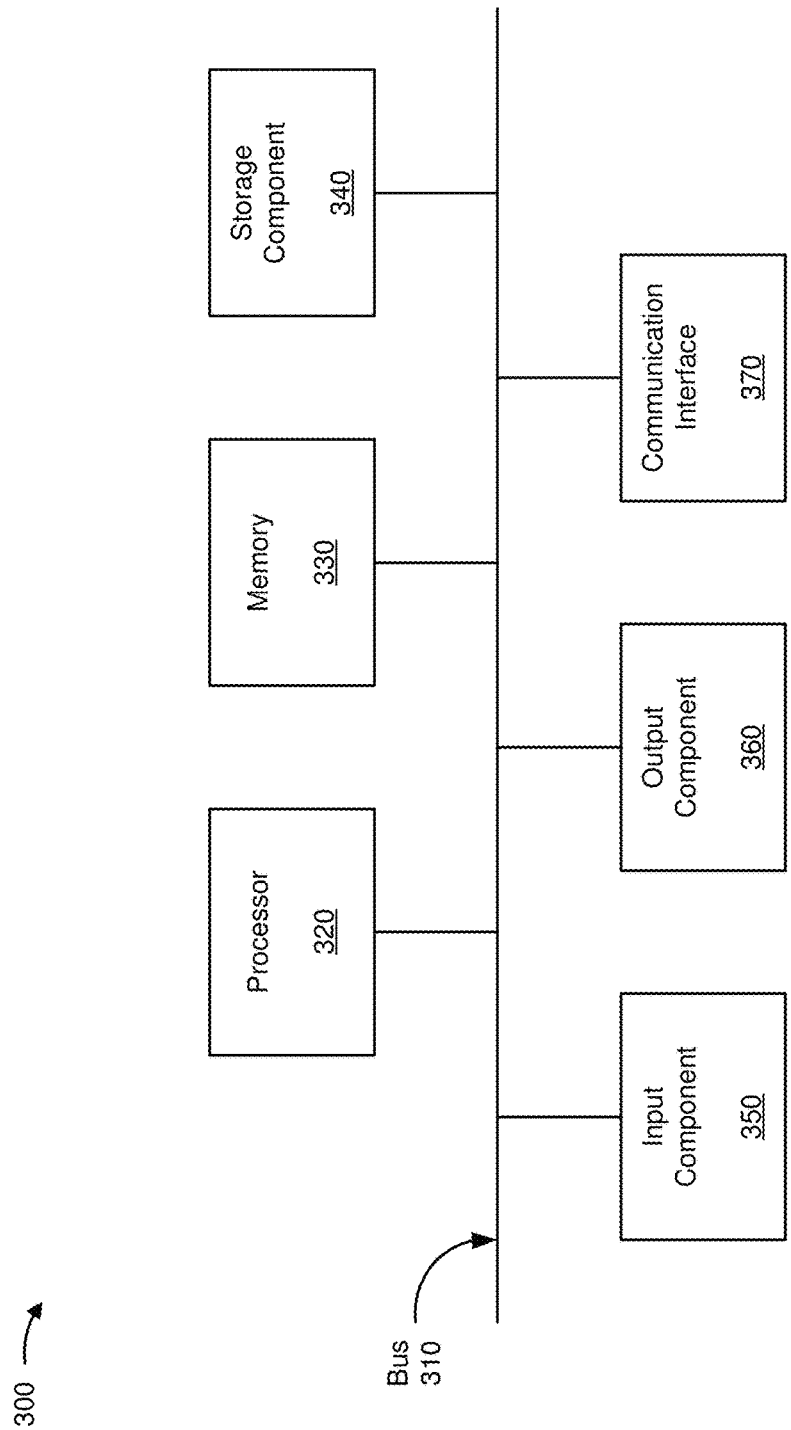
FIG. 3 is a diagram of example components of devices of FIG. 2.

FIG. 3 is a diagram of example components of a device 300. Device 300 may correspond to user device 210, profile identifier platform 220, computing resource 230, and/or social media device 250. In some implementations, user device 210, profile identifier platform 220, computing resource 230, and/or social media device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform processes described herein. Additionally, or alternatively, hardwired circuitry may be used in place of or in combination with software instructions to perform processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., components) of device 300 may perform functions described as being performed by another set of components of device 300.

FIG. 4 is a flow chart of an example process 400 for receiving and configuring a profile identifier application for a user device. In some implementations, process blocks of FIG. 4 may be performed by user device 210. In some implementations, process blocks of FIG. 4 may be performed by another device or a group of devices separate from or including user device 210, such as profile identifier platform 220.

As shown in FIG. 4, process 400 may include providing a request for a profile identifier application (block 410). For example, a user may cause user device 210 to provide a request for a profile identifier application to profile identifier platform 220.

In some implementations, the profile identifier application may include an application, a code snippet, a script, a widget, etc. that causes user device 210 to interact with profile identifier platform 220 and perform functions described herein. For example, the profile identifier application may enable the user to set preferences for capturing images and/or video of people, and providing the images/video to profile identifier platform 220 for analysis. In some implementations, the user may cause user device 210 to access the profile identifier application via, for example, a user interface (such as a browser) provided by profile identifier platform 220, an application store, or some other source of applications. The user may then select, using user device 210, information regarding the profile identifier application from the user interface to cause user device 210 to provide a request for the profile identifier application to profile identifier platform 220, the application store, or the like. In some implementations, profile identifier platform 220 may offer the profile identifier application to user device 210 without user device 210 providing the request for the profile identifier application.

As further shown in FIG. 4, process 400 may include receiving the profile identifier application based on the request (block 420). For example, user device 210 may receive the profile identifier application from profile identifier platform 220, and may store the profile identifier application in a memory associated with user device 210 (e.g., memory 330, FIG. 3). In some implementations, the user, of user device 210, may establish an account associated with the profile identifier application prior to or after receiving the profile identifier application. In some implementations, the profile identifier application may be stored in profile identifier platform 220 (e.g., and not in user device 210), and user device 210 may access the profile identifier application via the user's account.

As further shown in FIG. 4, process 400 may include initiating a configuration of the profile identifier application (block 430). For example, the user may initiate the profile identifier application and identify, using user device 210, preferences relating to images, video, and other information captured by user device 210 and analyzed by profile identifier platform 220.

In some implementations, the user may identify the preferences using elements of a user interface provided by user device 210 and/or by profile identifier platform 220 to user device 210. The elements may include, for example, text input elements, drop down menu elements, checkbox elements, radio button elements, and/or any other types of elements that may be used to receive information from the user.

In some implementations, a preference may include an event associated with people for which profile information is to be received (e.g., from profile identifier platform 220) by user device 210 (e.g., via the profile identifier application). For example, an event may include a conference, a business meeting, a party, a miscellaneous event, or the like.

In some implementations, a preference may include capture methods used to capture information (e.g., by user device 210) associated with people at the event. For example, the user may select capturing an image, capturing a video, receiving or capturing a text file, determining a location associated with user device 210, or the like, as methods used to capture information by user device 210.

In some implementations, a preference may include biography information to be provided about people for which information is captured by user device 210, and an order of priority of the biography information. For example, the user may specify that the biography information should be based on similarities of the peoples' profiles with the user's profile, that the biography information should include pictures of the people, current locations of the people, current employers of the people, past employers of the people, other people in common with captured people, schools associated with the people, hobbies associated with the people (e.g., charities of interest), or the like. In some implementations, a preference may include locations or sources associated with the biography information (e.g., the biography information should be obtained from LinkedIn, Facebook, Google+, local memory of user device 210, or the like).

In some implementations, a preference may include receiving biography information associated with only target people (e.g., recruiting candidates, target clients, vendors, people that the user knows, or the like), and a priority associated with the target people. For example, the user may specify that user device 210 is to receive biography information associated with only recruiting candidates that include attorneys, candidates with an engineering degree, candidates that are former patent examiners, candidates with a marketing degree, or the like.

Alternatively, or additionally, the preferences may include a preference of the user with respect to the profile identifier application sending notifications. For example, the user may indicate that the profile identifier application is to send notifications to the user or to others associated with user device 210 (e.g., via a text message, an email message, a voicemail message, a voice call, or the like).

Alternatively, or additionally, a type of the account, of the user, associated with the profile identifier application may determine the quantity of preferences that the user is able to specify. For example, the profile identifier application may enable the user to specify only a portion of the above preferences or specify additional preferences based on the type of the account with which the user is associated.

As further shown in FIG. 4, process 400 may include providing information identifying preferences (block 440). For example, the user may cause user device 210 to provide, to profile identifier platform 220, information identifying the preferences relating to the user (e.g., during the configuration of the profile identifier application).

As further shown in FIG. 4, process 400 may include receiving configuration information based on the preferences (block 450). For example, user device 210 may receive, from profile identifier platform 220, configuration information that may be used to configure the profile identifier application for capturing images and/or video of people, and providing the images/video to profile identifier platform 220 for analysis and provision of profile information.

In some implementations, profile identifier platform 220 may generate the configuration information, which may be used to configure the profile identifier application, based on the information identifying the preferences associated with the user. For example, the configuration information may include information that causes the profile identifier application to capture images and/or video of people, and provide the images/video to profile identifier platform 220 for analysis and provision of profile information.

Alternatively, or additionally, the configuration information may include information that causes profile identifier platform 220 to send notifications (e.g., to user device 210). Alternatively, or additionally, the configuration information may be obtained from a data structure. In some implementations, profile identifier platform 220 may provide, to user device 210, the configuration information independent of receiving the information identifying the preferences of the user.

As further shown in FIG. 4, process 400 may include storing the configuration information and configuring the profile identifier application based on the configuration information (block 460). For example, the user may cause user device 210 to store all or a portion of the configuration information received from profile identifier platform 220. Alternatively, the profile identifier application may cause user device 210 to automatically store all or a portion of the configuration information received from profile identifier platform 220 (e.g., without user intervention). The profile identifier application may be configured based on storing all or a portion of the configuration information. In some implementations, profile identifier platform 220 may store all or a portion of the configuration information.

In some implementations, profile identifier platform 220 may provide updates, to the configuration information, to user device 210 based on use of the profile identifier application by user device 210. For example, profile identifier platform 220 may receive updates, to the configuration information, and may provide the received updates to user device 210. User device 210 may store the updates to the configuration information. In some implementations, profile identifier platform 220 may provide the updates periodically based on a preference of the user and/or based on a time frequency determined by profile identifier platform 220. In some implementations, profile identifier platform 220 may determine whether to provide the updates based on the type of the account associated with the user.

In some implementations, the profile identifier application may include gamification aspects. For example, the profile identifier application may enable a user of user device 210 to share information associated with the profile identifier application with another user in exchange for the other user sharing information associated with the other user's profile identifier application with the user. In another example, users of the profile identifier application may be rewarded (e.g., with gift cards, enhanced application features, or the like) for sharing information with other users of the profile identifier application. Such an arrangement may enable creation of a community of users of the profile identifier application and thereby improve operation of profile identifier platform 220.

With such a community, if the user of user device 210 is at a conference and wants to meet a person who is also in the community, the profile identification application may utilize location information, associated with the person, to notify the user that the person is in proximity to the user. This way the user may easily meet the person at the conference.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
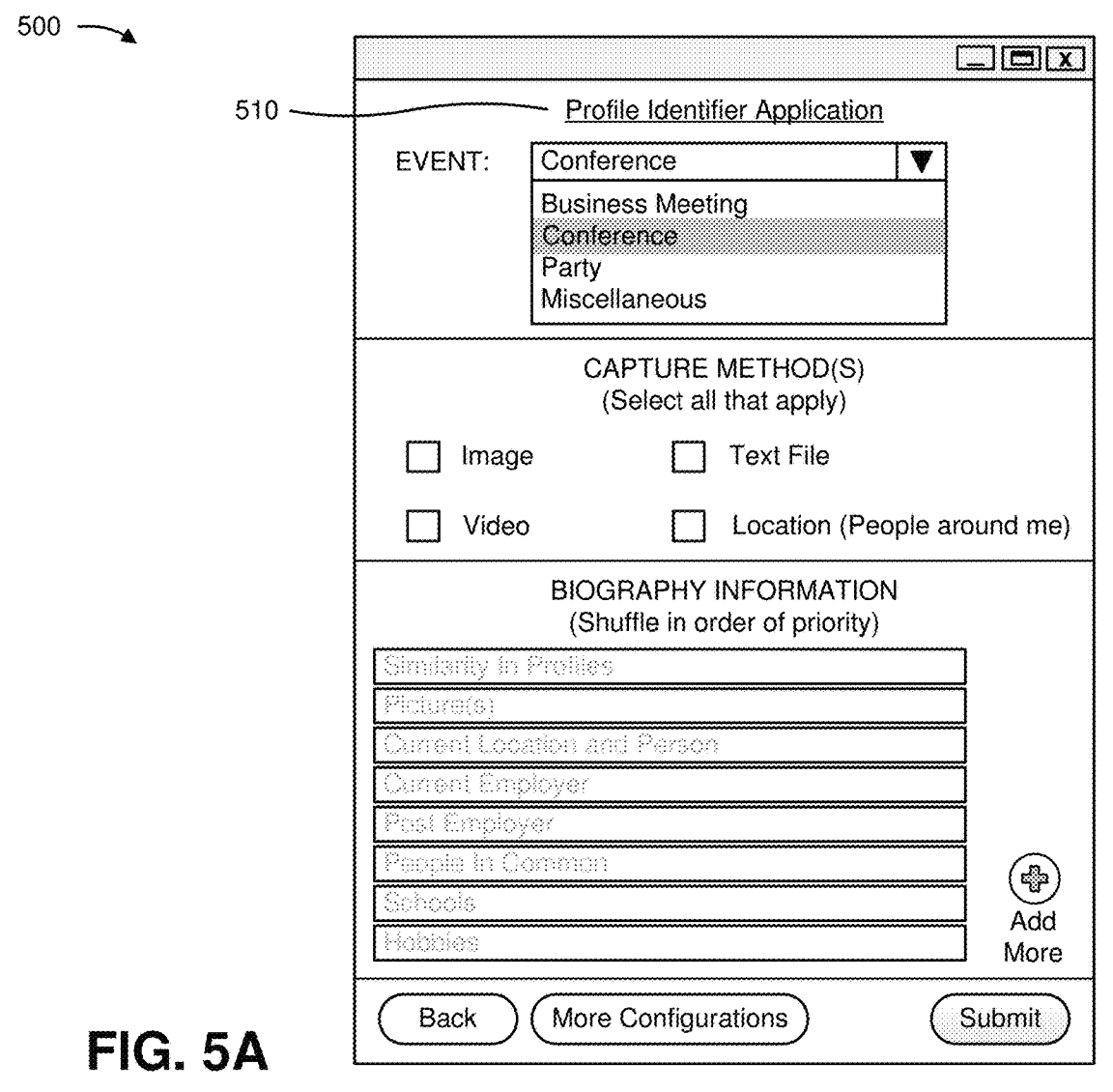

FIGS. 5A-5C are diagrams 500 of example user interfaces that may be used in connection with example process 400 shown in FIG. 4. In some implementations, the user interfaces of FIGS. 5A-5C may be provided by profile identifier platform 220 to user device 210 to enable a user to identify information (e.g., preferences) that may be used to configure a profile identifier application 510 so that user device 210 may receive profile information, associated with people, from profile identifier platform 220.

As an example, assume that the user has previously caused user device 210 to request and download profile identifier application 510 or to log into an account associated with profile identifier application 510. Further assume that the user causes user device 210 to install profile identifier application 510 on user device 210. When the user logs into the account or user device 210 installs profile identifier application 510, profile identifier platform 220 may provide a user interface to user device 210, and user device 210 may display the user interface to the user. The user interface may allow the user to configure different features of profile identifier application 510.

As shown in FIG. 5A, profile identifier application 510 may include an input mechanism (e.g., a pull-down menu) from which the user may identify preferences for an event attended by people. For example, that the user may identify a conference, a business meeting, a party, a miscellaneous event, or the like, as the event associated with people.

As further shown in FIG. 5A, the user may identify preferences associated with capture methods used to capture information (e.g., by user device 210) associated with people at the event, and may select all capture methods that apply. For example, the user may select capturing an image, capturing a video, receiving or capturing a text file, determining a location associated with user device 210, or the like, as methods used to capture information by user device 210.

As further shown in FIG. 5A, the user may identify preferences for biography information to be provided about people for which information is captured by user device 210. For example, the user may specify that the biography information should be based on similarities of the peoples' profiles with the user's profile, that the biography information should include pictures of the people, current locations of the people, current employers of the people, past employers of the people, other people in common with captured people, schools associated with the people, hobbies associated with the people, or the like. In some implementations, the user may rearrange or shuffle an order of priority for the preferences associated with the biography information. Profile identifier application 510 also may allow the user to select an "Add More" option to cause user device 210 to add more preferences associated with biography information. Once the user has identified the preferences, profile identifier application 510 may permit the user to select a "Submit" option to store the preferences and/or submit the preferences to profile identifier platform 220. Profile identifier platform 220 may then provide, to user device 210, configuration information based on the preferences.

As further shown in FIG. 5A, profile identifier application 510 may allow the user to select a "Back" option to cause user device 210 to return to a previous display on the user interface. Profile identifier application 510 also may allow the user to select a "More Configurations" option to enable the user to identify additional information that may be used to configure profile identifier application 510.

As shown in FIG. 5B, the user may identify preferences for biography locations, and the user may select all biography locations that apply. A biography location may include a source (e.g., social media services provided by social media devices 250) of the biography information to be received by user device 210. For example, the user may identify social media services, such as LinkedIn, Facebook, Google+, Instagram, Twitter, or the like, as sources of the biography information, and/or may identify a local memory (e.g., memory 330 and/or storage component 340, FIG. 3) of user device 210 as a source of the biography information.

As further shown in FIG. 5B, the user may identify preferences for receiving biography information associated with target people (e.g., recruiting candidates, target clients, vendors, people that the user knows, or the like). For example, the user may specify that user device 210 is to receive biography information associated with only target clients associated with the user. In some implementations, the user may identify priorities associated with the target people. For example, as shown in FIG. 5B, people that the user knows may be a first priority of the user, target clients may a second priority of the user, recruiting candidates may be a third priority of the user, and vendors may be a fourth priority for the user.

As shown in FIG. 5B, profile identifier application 510 may allow the user to select the "Back" option to cause user device 210 to return to a previous display on the user interface. Profile identifier application 510 also may allow the user to select a "More Configurations" option to enable the user to identify additional information that may be used to configure profile identifier application 510.

As shown in FIG. 5C, profile identifier application 510 may allow the user to specify categories associated with each of the target people (e.g., the recruiting candidates, the target clients, the vendors, and the people that the user knows). For example, profile identifier application 510 may include an input mechanism (e.g., a pull-down menu), for each of the target people, that may be used to specify the categories. As shown in FIG. 5C, the user may specify that the recruiting candidates are to include attorneys, candidates with an engineering degree, candidates that are former patent examiners, and candidates that possess a marketing degree.

Once the user has identified the preferences, profile identifier application 510 may allow the user to select a "Submit" option to store the preferences and/or submit the preferences to profile identifier platform 220. Profile identifier platform 220 may then provide, to the user device, configuration information based on the preferences.

The number and arrangement of elements of the user interfaces shown in FIGS. 5A-5C are provided for explanatory purposes. In practice, the user interfaces shown in FIGS. 5A-5C may include additional elements, fewer elements, different elements, or differently arranged elements than those shown in FIGS. 5A-5C.

Figure 6:
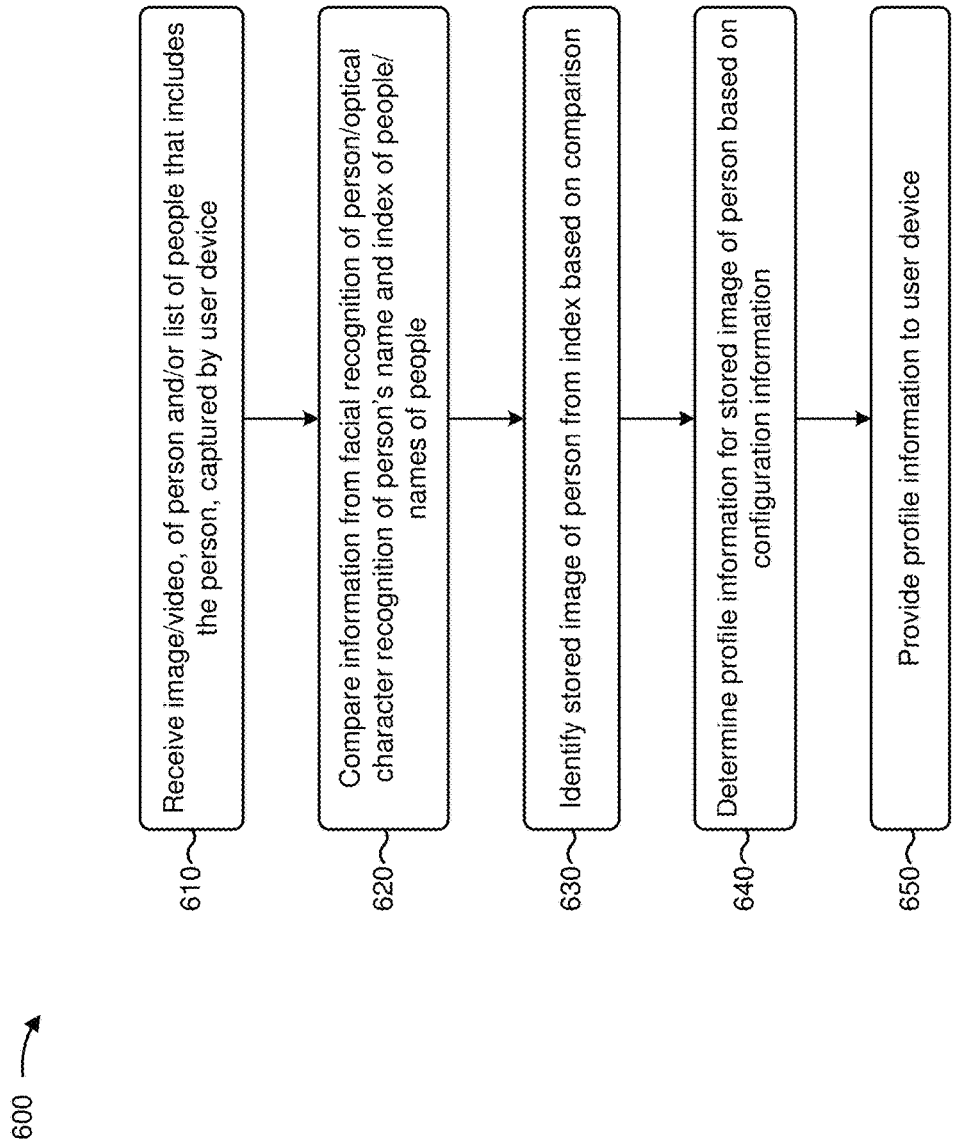
FIG. 6 is a flow chart of an example process for identifying profile information based on captured information.

FIG. 6 is a flow chart of an example process 600 for identifying profile information based on captured information. In some implementations, process blocks of FIG. 6 may be performed by profile identifier platform 220. In some implementations, process blocks of FIG. 6 may be performed by another device or a group of devices separate from or including profile identifier platform 220, such as user device 210.

As shown in FIG. 6, process 600 may include receiving an image and/or a video, of a person and/or a list of people that includes the person, captured by a user device (block 610). For example, user device 210 (e.g., via profile identifier application 510) may capture an image of a person, may capture of a video of the person, and/or may receive or capture a textual list of people that includes a name of the person. The captured image, the captured video, and the received or captured textual list may be referred to generally as "captured information." User device 210 may provide the captured information to profile identifier platform 220, and profile identifier platform 220 may receive the captured information from user device 210.

In some implementations, profile identifier platform 220 may receive the captured information periodically, automatically, in response to a request by profile identifier platform 220, in response to a request from user device 210, or the like. In some implementations, if the captured information includes video, user device 210 may provide one or more frames of video to profile identifier platform 220. In some implementations, the captured information may be captured using a wearable device (e.g., smart glasses, a smart watch, a smart camera, jewelry with a camera, or the like) separate from but associated with user device 210. In such implementations, the captured information may be provided by the wearable device to user device 210, and user device 210 may provide the captured information to profile identifier platform 220. Alternatively, the captured information may be provided by the wearable device directly to profile identifier platform 220. In some implementations, when the captured information is captured using a wearable device, information (e.g., an alert, an image, a video, or the like) may be provided by user device 210 when a person of interest (e.g., a target client, a competitor, or the like) is captured by the wearable device.

As further shown in FIG. 6, process 600 may include comparing information, from facial recognition of a person and/or from an optical character recognition (OCR) of the person's name, and an index of people and/or names of people (block 620). For example, profile identifier platform 220 may compare information from facial recognition of the person in the image/video and/or from an OCR of the person's name and an index of people and/or names of people.

In some implementations, if the captured information includes an image or a video, profile identifier platform 220 may perform facial recognition of a person in the image and/or the video, and may identify features of the person based on performing the facial recognition. In some implementations, the facial recognition may identify facial features by extracting landmarks, or features, from an image of a person's face. For example, the facial recognition may analyze a relative position, size, and/or shape of a head, eyes, a nose, cheekbones, and a jaw of the person, and these features may be utilized to search for other images with matching features. In some implementations, the facial recognition may include principal component analysis using eigenfaces, linear discriminant analysis, elastic bunch graph matching using the Fisherface algorithm, a hidden Markov model, multilinear subspace learning using tensor representation, neuronal motivated dynamic link matching, or the like. In some implementations, user device 210 may perform the facial recognition of the image/video, and may provide results of the facial recognition to profile identifier platform 220.

In some implementations, if the captured information includes an image of a list of people, profile identifier platform 220 may perform an OCR of the list of people, and may identify a name of the person based on performing the OCR. In some implementations, the OCR may include a conversion of images (e.g., from a scanned document, a photo of a document, or the like) of typed, handwritten, or printed text into machine-encoded text. In some implementations, the OCR may include matrix matching, pattern matching, pattern recognition or image correlation (e.g., which involves comparing an image to a stored glyph on a pixel-by-pixel basis), feature extraction (e.g., which decomposes glyphs into features, like lines, closed loops, line direction, and line intersections, that are compared with an abstract vector-like representation of a character), or the like. In some implementations, profile identifier platform 220 may receive an electronic list of people from user device 210, and may not need to perform the OCR of the electronic list of people. In some implementations, user device 210 may perform the OCR of the list of people, and may provide results of the OCR to profile identifier platform 220.

In some implementations, profile identifier platform 220 may compare information from the facial recognition (e.g., facial features of the person) and/or information from the OCR (e.g., a name of the person) and an index of information (described in connection with FIG. 7). The index may include stored images of people, information associated with the people in images (e.g., names, email addresses, email account identifiers, telephone numbers, company names, job titles, social media account information, or the like, of the people), or the like.

As further shown in FIG. 6, process 600 may include identifying a stored image of a person from the index based on the comparison (block 630). For example, profile identifier platform 220 may identify a stored image of a person, from the index, that matches the facial features of the person captured by the image/video, and/or may identify a stored name from the index that matches the name of the person identified from the list of people.

In some implementations, profile identifier platform 220 may generate a score for a stored image that matches the facial features of the person captured by the image/video, and/or may generate a score for a stored name the matches the name of the person from the list of people. For example, a score may be based on factors, such as degree of match between the facial features of the image/video and the stored image, a degree of match between the person's name and the stored name, and/or a combination of the aforementioned degrees of match.

In some implementations, profile identifier platform 220 may apply different weights to different factors and/or to different types of factors. For example, profile identifier platform 220 may apply a first (high) weight to a name match, may apply a second (medium) weight to an image match, and/or may apply a third (low) weight to another factor (e.g., an expected location of the person). As another example, profile identifier platform 220 may apply different weights to different types of factors (e.g., factors associated with the sources of the stored images, factors associated with resolution qualities of the stored images, or the like). In some implementations, profile identifier platform 220 may apply both types of weights described above (e.g., for a hierarchical weighting). For example, different weights may be applied to image matches as compared to factors associated with the sources of the stored images, and different weights may be applied to name matches as compared to factors associated with resolution qualities of the stored images.

In some implementations, profile identifier platform 220 may generate a score for a matching image based on applying analytics (e.g., a model, machine learning, artificial intelligence, neural networks, decision trees, or the like) and/or based on weights assigned to the matching image. For example, profile identifier platform 220 may input a training set of data into a model (known factors), and may apply machine learning on the training set to identify factors and/or combinations of factors likely to cause a match. Profile identifier platform 220 may then apply the model, as factors are received, to calculate a score representative of a likelihood of a match. In some implementations, profile identifier platform 220 may continue to train the model when additional information is received. In some implementations, profile identifier platform 220 may generate scores for matching images, and may rank the matching images based on the scores. Profile identifier platform 220 may select a matching image with the highest score as the stored image of the person.

In some implementations, profile identifier platform 220 may use real-time information or information most recently received from other devices (e.g., social media devices 250, user devices 210, or the like). In this way, profile identifier platform 220 may provide, and user device 210 may receive, more accurate profile information.

In some implementations, profile identifier platform 220 may receive information about an identity of the person captured by the image/video from one or more passive devices (e.g., beacons, Bluetooth devices, wearable devices). For example, a wearable device worn by the person captured by the image/video may indicate that the person in a room with the user. In such implementations, the information about the identity of the person captured by the image/video may increase or decrease a confidence level that the facial recognition of the person is correct.

In some implementations, profile identifier platform 220 may receive contextual information about a location (e.g., a conference, a setting, etc.) associated with the person captured by the image/video. Such contextual information may aid the facial recognition in identifying the person (e.g., based on indexed information collected from biographies), which may increase a confidence level that the facial recognition of the person is correct. For example, if two people look very similar, but a first person is a marketing professional and a second person is a legal professional, and the image/video is captured at a legal conference, the contextual information (e.g., that the location is a legal conference) may cause profile identifier platform 220 to identify the second person with a greater confidence level than a confidence level of the first person.

As further shown in FIG. 6, process 600 may include determining profile information for a stored image of a person based on configuration information (block 640). For example, profile identifier platform 220 may determine profile information for the stored image of the person based on configuration information received from user device 210.

In some implementations, profile identifier platform 220 may obtain, from an index, profile information that is associated with the matching stored image of the person. In some implementations, the profile information may include information received from social media devices 250 and/or other sources (e.g., search engine results), such as a name, an email address, an email account identifier, a telephone number, a company name, a job title, social media account information, or the like, associated with the person identified in the stored image. In some implementations, profile identifier platform 220 may obtain particular profile information from the index based on the configuration information received from user device 210, as discussed above with reference to FIGS. 4-5C. In some implementations, based on the configuration information, profile identifier platform 220 may create a custom profile for the person identified in the stored image. In some implementations, profile identifier platform 220 may arrange and provide the profile information in accordance with the configuration information. In some implementations, the custom profile may include information obtained from one or more different social media services provided by social media devices 250. For example, the custom profile may include employer information and college degree information obtained from a first social media service (e.g., LinkedIn), and may include hobbies and interests obtained from a second social media service (e.g., Facebook).

In some implementations, the custom profile may include information indicating a confidence level associated with a match between the person captured in the image/video and the person identified in the stored image. For example, the information indicating the confidence level, associated with a match between the person captured in the image/video and the person identified in the stored image, may include a percentage (e.g., with 100% being the greatest confidence level), a color coded scheme (e.g., with green indicating a greatest confidence level, yellow indicating a next greatest confidence level, and red indicating a lowest confidence level), or the like.

As further shown in FIG. 6, process 600 may include providing the profile information to the user device (block 650). For example, profile identifier platform 220 may provide the determined profile information to user device 210 in accordance with the configuration information.

In some implementations, user device 210 may receive the profile information, and may display the profile information with the captured image/video, via the profile identifier application 510, or the like. In some implementations, user device 210 may not immediately display the profile information, but may provide an alert, to the user, indicating that profile information is available. For example, user device 210 may output an audible alert (e.g., an alarm), a visual alert (e.g., a flashing indicator light), or the like. In some implementations, the profile information may be displayed by user device 210 in accordance with the preferences of the user and/or the configuration information associated with profile identifier application 510.

In some implementations, profile identifier platform 220 may not customize the profile information, and may provide all profile information, associated with the person identified in the stored image, to user device 210. In such implementations, user device 210 may display all of the profile information, and/or may edit the profile information to create a custom profile. User device 210 may then display the custom profile to the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
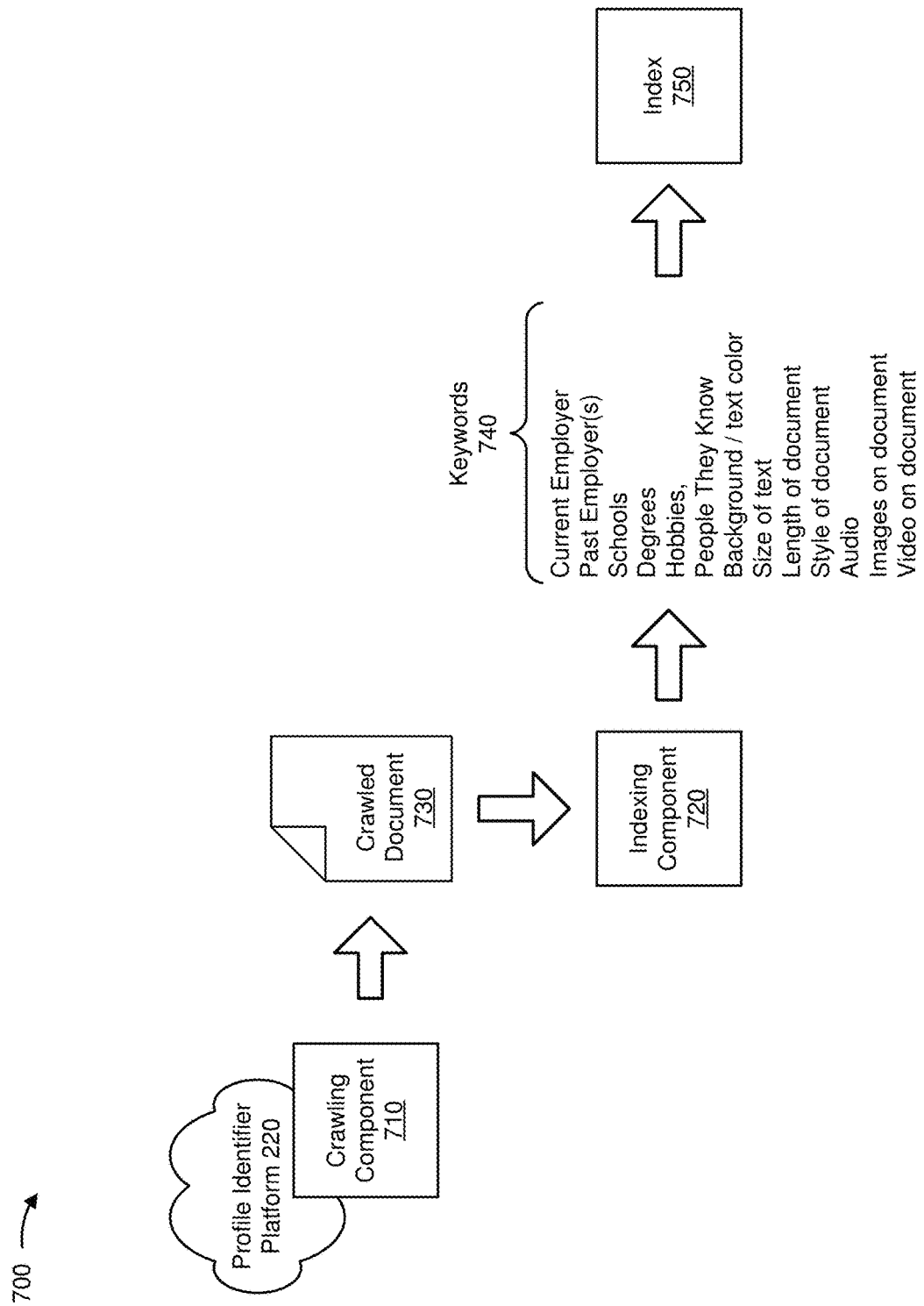
FIG. 7 is a diagram of an example for creating an index of profile information based on information obtained from social media devices.

FIG. 7 is a diagram 700 of an example for creating an index of profile information based on information obtained from social media devices 250 and/or other sources (e.g., search engines, public databases, or the like). In some implementations, the creation of the index may be performed by profile identifier platform 220. In some implementations, the creation of the index may be performed by another device or a group of devices separate from or including profile identifier platform 220, such as social media devices 250.

As shown in FIG. 7, a crawling component 710 of profile identifier platform 220 may crawl a document 730 in a repository of documents. The repository of documents may include documents (e.g., web pages) maintained by social media devices 250, and document 730 may include a web page. The crawling may include using an address of document 730 to obtain document 730, and storing all or a portion of document 730 in a memory. In some implementations, crawling component 710 may crawl documents that have been provided by social media devices 250 to profile identifier platform 220. In some implementations, crawling component 710 may receive documents from social media devices 250, and may store the documents in the repository of documents (e.g., provided in profile identifier platform 220).

In some implementations, profile identifier platform 220 may create a keyword based on the content of the document 730 or information associated with document 730. For example, an indexing component 720 of profile identifier platform 220 may extract information from the text and/or hypertext markup language (HTML) code of document 730. Indexing component 720 may associate, in an index 750, the extracted information, as keywords 740, with information identifying document 730.

In some implementations, indexing component 720 of profile identifier platform 220 may use natural language processing, text analysis, and/or computational linguistics to perform term lemmatization and/or term extraction to identify (e.g., extract) terms, a set of characters, such as a single character, multiple characters (e.g., a character string), a combination of characters that form multiple words (e.g., a multi-word term, such as a phrase, a sentence, or a paragraph), a combination of characters that form an acronym, a combination of characters that form an abbreviation of a word, or a combination of characters that form a misspelled word, included in the repository of documents.

In some implementations, keywords 740 may relate to a current employer of a person identified within document 730. For example, indexing component 720 may create, from the HTML code of document 730, a keyword 740 indicating whether document 730 includes a current employer of a person. In some implementations, a creator of document 730 may store, in the HTML code, a name of the current employer of the person that is identified within document 730 or other information relating to the current employer. In this case, indexing component 720 may create keywords 740 based on the name and/or the other information.

In some implementations, keywords 740 may relate to past employers of the person identified within document 730. For example, indexing component 720 may create, from the HTML code of document 730, a keyword 740 indicating whether document 730 includes a past employer. In some implementations, a creator of document 730 may store, in the HTML code, a name of a past employer of the person identified within document 730 or other information relating to the past employer. In this case, indexing component 720 may create keywords 740 based on the name and/or the other information.

In some implementations, keywords 740 may relate to schools associated with the person identified within document 730. For example, indexing component 720 may create, from the HTML code of document 730, a keyword 740 indicating whether document 730 includes schools. In some implementations, a creator of document 730 may store, in the HTML code, a name of a school that is associated with the person identified within document 730 or other information relating to the school. In this case, indexing component 720 may create keywords 740 based on the name and/or the other information.

In one example, keywords 740 may relate to degrees associated with the person identified within document 730. For example, indexing component 720 may create, from the HTML code of document 730, a keyword 740 indicating whether document 730 includes degrees. In some implementations, a creator of document 730 may store, in the HTML code, a name of a degree that is associated with the person identified within document 730 or other information relating to the degree. In this case, indexing component 720 may create keywords 740 based on the name and/or the other information.

In one example, keywords 740 may relate to hobbies associated with the person identified within document 730. For example, indexing component 720 may create, from the HTML code of document 730, a keyword 740 indicating whether document 730 includes hobbies. In some implementations, a creator of document 730 may store, in the HTML code, a name of a hobby that is associated with the person identified within document 730 or other information relating to the hobby. In this case, indexing component 720 may create keywords 740 based on the name and/or the other information.

In one example, keywords 740 may relate to people known by the person identified within document 730. For example, indexing component 720 may create, from the HTML code of document 730, a keyword 740 indicating whether document 730 includes people known by the person. In some implementations, a creator of document 730 may store, in the HTML code, a name of a particular person known by the person identified within document 730 or other information relating to the particular person. In this case, indexing component 720 may create keywords 740 based on the name and/or the other information.

In one example, keywords 740 may relate to visual features of document 730. For example, indexing component 720 may create, from the HTML code of document 730, a keyword 740 corresponding to the color of the background of document 730 when document 730 is rendered for display, a keyword 740 corresponding to the color of the text in document 730 when document 730 is rendered for display, and/or a keyword 740 corresponding to the size of the text in document 730 when document 730 is rendered for display.

In one example, keywords 740 may relate to a length or a style of document 730. For example, indexing component 720 may create, from the HTML code of document 730, a keyword 740 indicating whether document 730 includes a length and/or a style. In some implementations, a creator of document 730 may store, in the HTML code, the length or the style of document 730 or other information relating to the length or the style. In this case, indexing component 720 may create keywords 740 based on the length, the style, and/or the other information.

In some implementations, indexing component 720 may render document 730 and may create a keyword 740 based on rendering document 730. For example, indexing component 720 may create a keyword 740 representing the length of document 730 or the style (e.g., a user-perceived style, such as warm, gothic, festive, etc.) of document 730 based on rendering document 730 for display. In some implementations, indexing component 720 may use a machine learning framework for determining the style of document 730. For example, a model may be created to predict the probability of a particular document being of a particular style. The model may receive, as training data, documents of different styles. During a training phase, attributes of the training documents may be analyzed to form a set of rules for predicting the probability of a document being of a particular one of the styles. The attributes may include colors used in the documents, patterns that appear on the documents when the documents are rendered for display, or the like. Once trained, the model may be used to predict the probability of other documents being of a particular style. Indexing component 720 may use the model to determine a style of document 730. Other techniques may be used to determine a length of document 730 or a style of document 730. For example, a column width of document 730 may be used to determine a length of document 730.

In some implementations, indexing component 720 may create keywords 740, relating to audio features and/or visual features of document 730. For example, when document 730 is determined to include a sound or music, indexing component 720 may obtain an audio file corresponding to the sound or the music. Indexing component 720 may create keywords 740 from analyzing the audio file. For example, if the audio file includes a name of the sound or the music and/or an artist name, indexing component 720 may generate a keyword 740 based on the sound/music name and/or the artist name. Additionally, or alternatively, indexing component 720 may play the audio file and generate keywords 740 representing the content of the audio file based on playing the audio file. In some implementations, the generation of keywords 740 for an audio file may be based on a machine learning framework.

In some implementations, indexing component 720 may create keywords 740, relating to an image when document 730 is rendered for display. For example, indexing component 720 may create a keyword associated with a name of an image in document 730 when document 730 is rendered for display. As another example, indexing component 720 may create a keyword 740 indicating a date and/or time when the image was captured when document 730 is rendered for display. As still another example, indexing component 720 may create a keyword 740 indicating a quantity of images in document 730 when document 730 is rendered for display.

As yet another example, when document 730 is determined to include a video, indexing component 720 may obtain a video file corresponding to the video. Indexing component 720 may create keywords 740 from the obtained video file. For example, if the video file includes a name of the video, indexing component 720 may generate a keyword 740 based on the name. Additionally, or alternatively, indexing component 720 may play the video, analyze features of the played video, and generate keywords 740 based on the analyzed features. In some implementations, the generation of keywords 740 for a video may be based on a machine learning framework.

The number and arrangement of components shown in FIG. 7 are provided as an example. In practice, profile identifier platform 220 may include additional components, fewer components, different components, or differently arranged components than those shown in FIG. 7. Additionally, or alternatively, a set of components (e.g., components) of profile identifier platform 220 may perform functions described as being performed by another set of components of profile identifier platform 220.

Figure 8A:
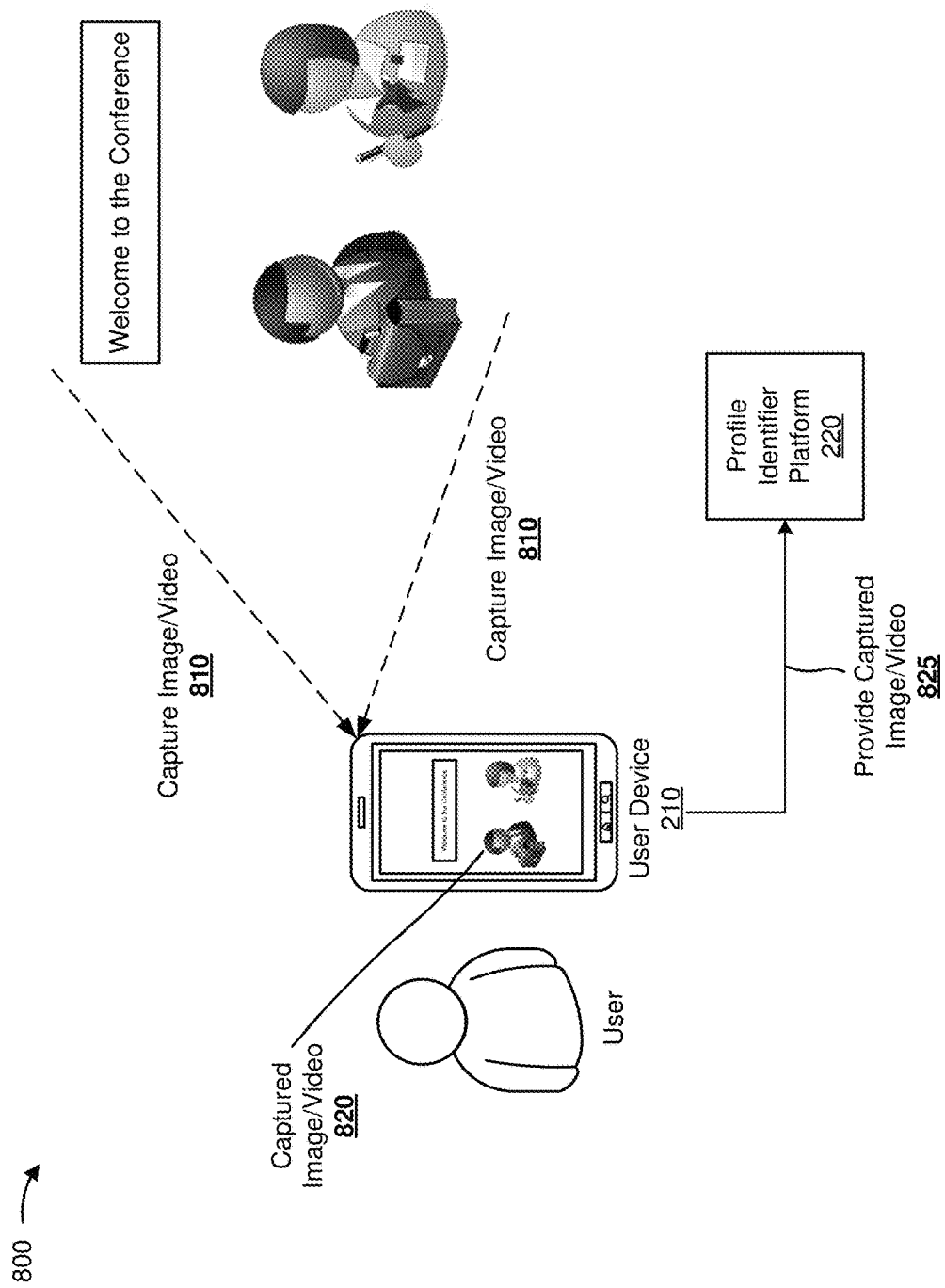
FIGS. 8A-8C are diagrams of an example implementation for identifying profile information based on captured information.
Figure 8B:
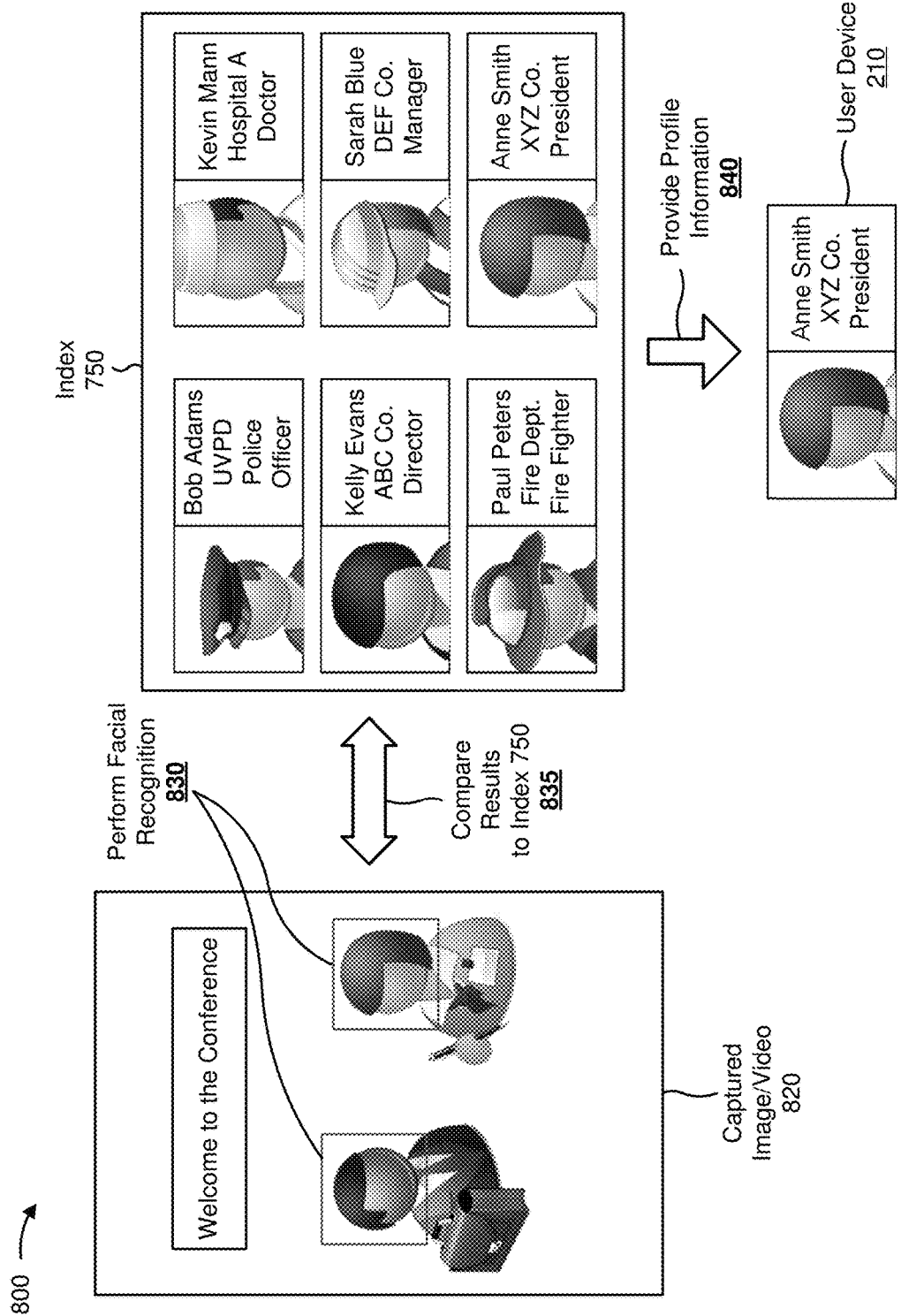
Figure 8C:
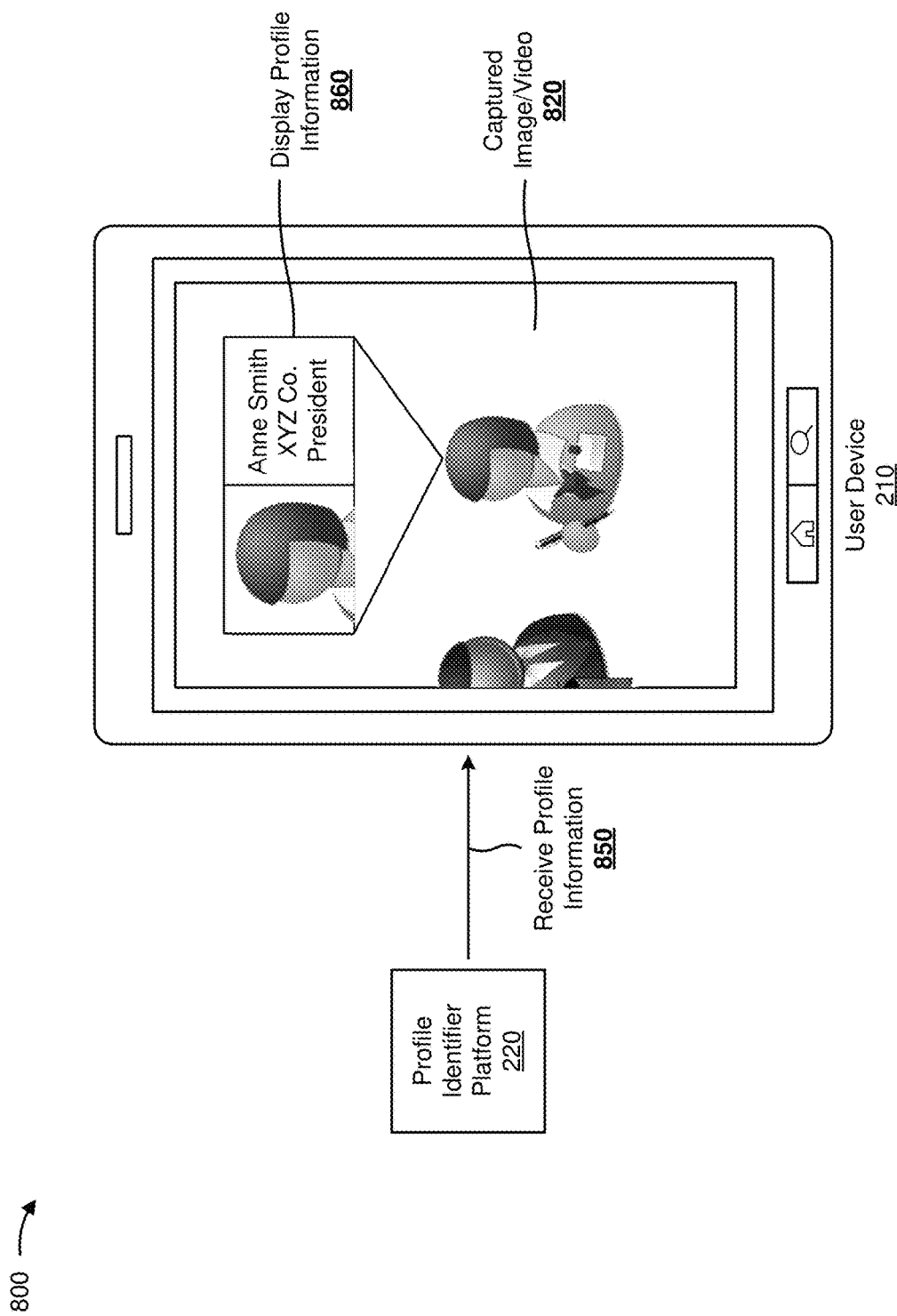

FIGS. 8A-8C are diagrams of an example implementation 800 for identifying profile information based on captured information. As shown in FIG. 8A, assume that a user utilizes user device 210 (e.g., profile identifier application 510 of user device 210) to capture an image and/or a video of people at a conference, as indicated by reference number 810. In some implementations, profile identifier application 510 may be configured to cause user device 210 to automatically capture images/videos whenever people are within a camera view of user device 210. As further shown in FIG. 8A, user device 210 may display a captured image/video 820 of the people at the conference. User device 210 may provide captured image/video 820 to profile identifier platform 220, as indicated by reference number 825, and profile identifier platform 220 may receive captured image/video 820.

As shown in FIG. 8B, profile identifier platform 220 may perform facial recognition on captured image/video 820 (e.g., on the faces of the two people in captured image/video 820), as indicated by reference number 830. As indicated by reference number 835, profile identifier platform 220 may compare information obtained from the facial recognition to stored images and profile information stored in index 750 (FIG. 7). Assume that profile identifier platform 220 identifies a stored image of a person (e.g., an image of Anne Smith), which matches one of the people in captured image/video 820, based on the comparison. As further shown in FIG. 8B, profile identifier platform 220 may determine profile information (e.g., a name (Anne Smith), an employer (XYZ Co.) and a title (President)) that corresponds to the identified stored image. As indicated by reference number 840, profile identifier platform 220 may provide the profile information to user device 210.

As shown in FIG. 8C, user device 210 may receive the profile information, as indicated by reference number 850, and may display the profile information with captured image/video 820, as indicated by reference number 860. For example, user device 210 may display the profile information associated with Anne Smith adjacent to captured image/video 820 of Anne Smith. As further shown in FIG. 8C, user device 210 may not display profile information with the other person in captured image/video 820 since the other person was not identified by profile identifier platform 220.

In some implementations, user device 210 and profile identifier platform 220 may be utilized in an augmented or virtual reality environment. For example, user device 210 may display the live captured image/video 820 of Anne Smith, and may augment or supplement the live captured image/video 820 with the profile information, as shown in FIG. 8C.

As indicated above, FIGS. 8A-8C are provided merely as an example. Other examples are possible and may differ from what was described with regard to FIGS. 8A-8C. In some implementations, the various operations described in connection with FIGS. 8A-8C may be performed automatically (without user input) or at the request of a user.

Figure 9A:
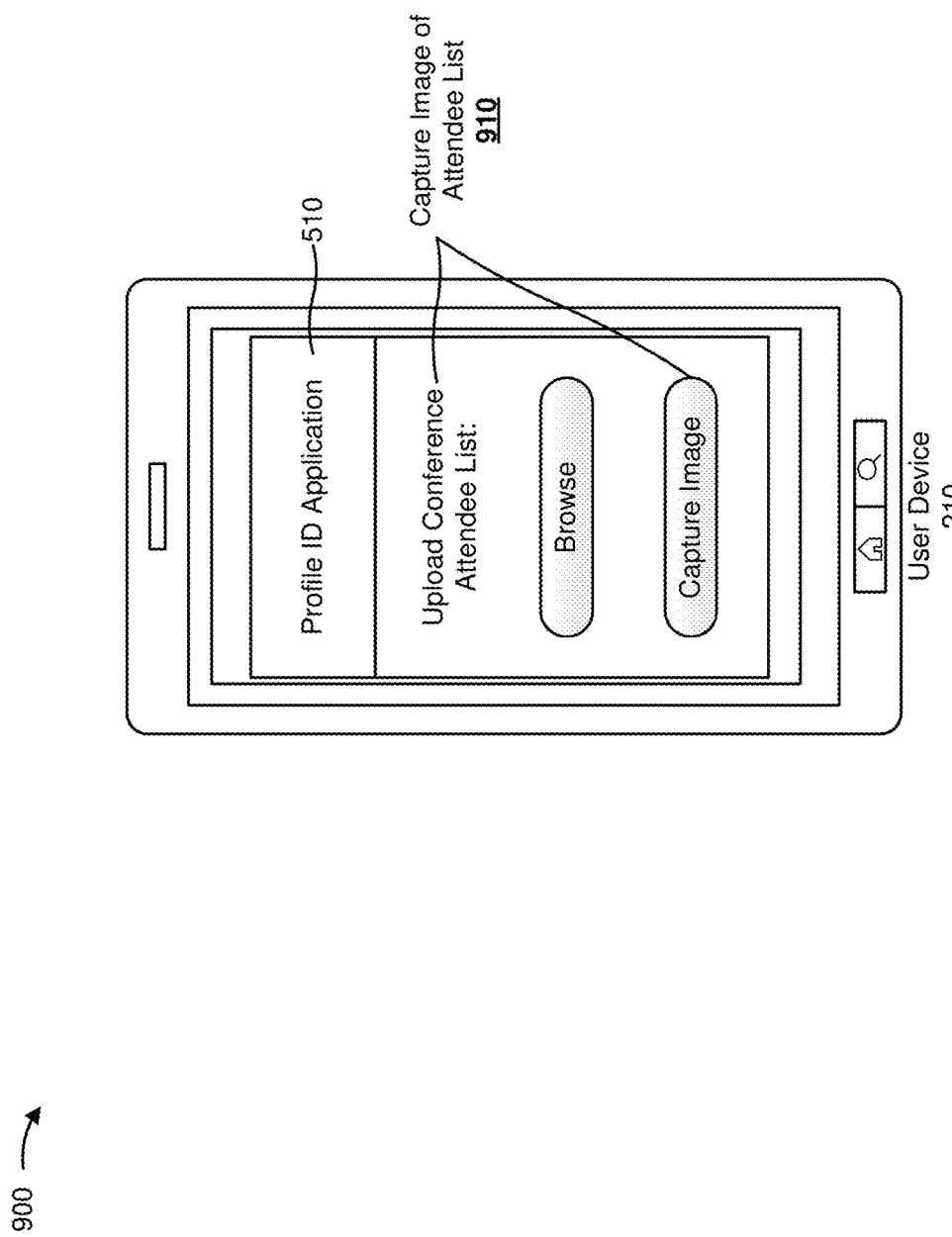
FIGS. 9A-9C are diagrams of an example implementation for identifying particular profile information based on an attendee list and particular interests.
Figure 9B:
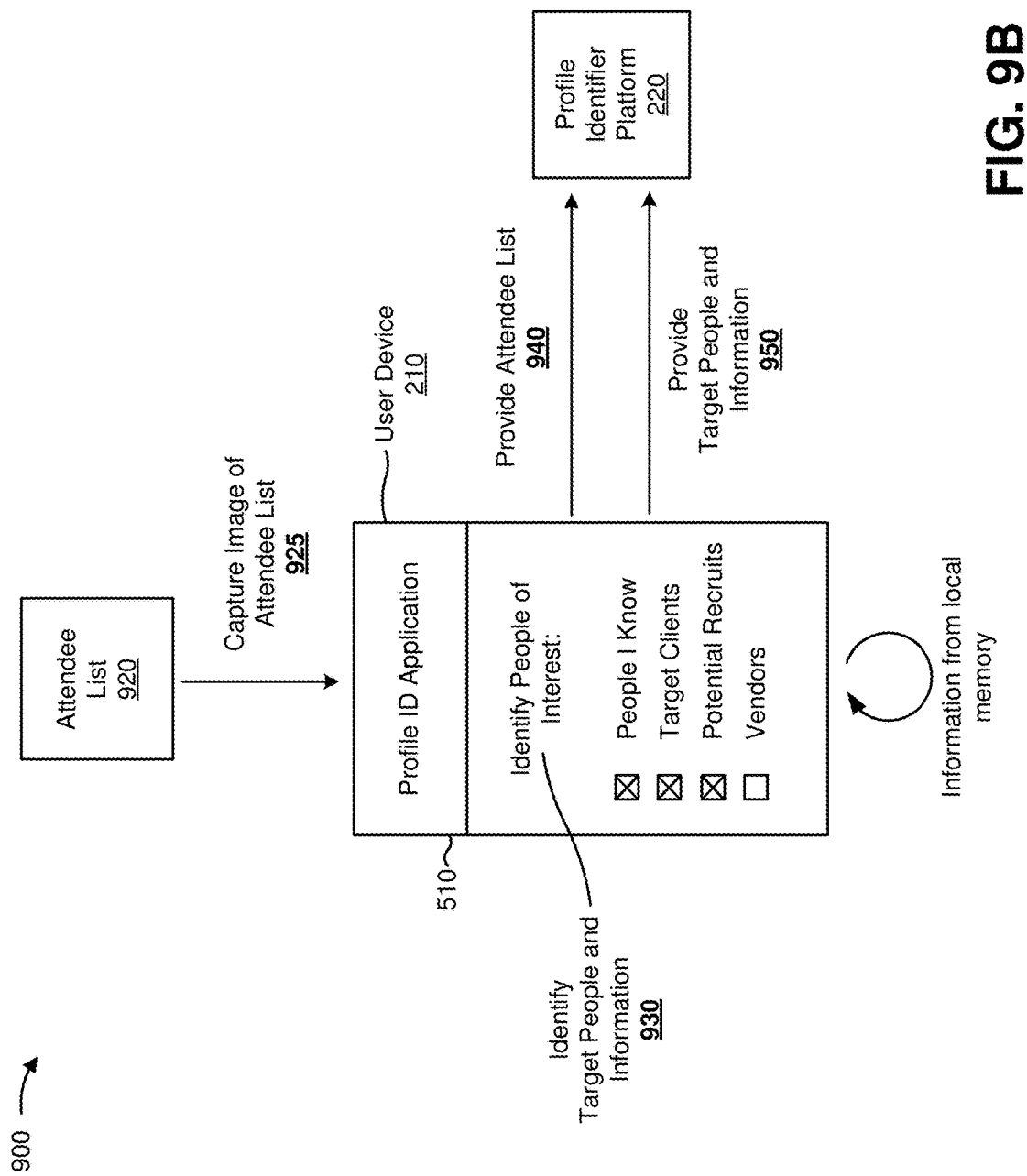
Figure 9C:
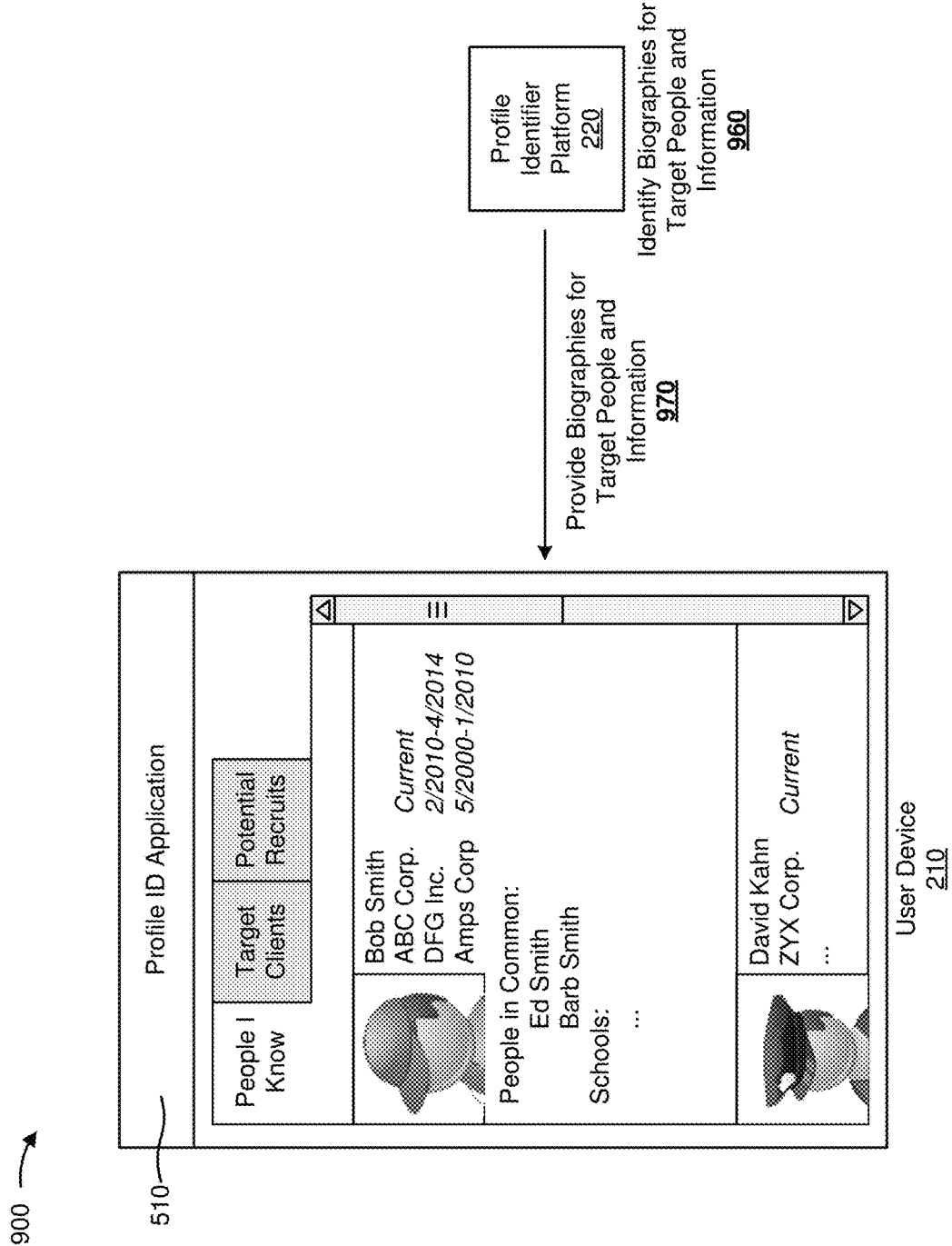

FIGS. 9A-9C are diagrams of an example implementation 900 for identifying particular profile information based on an attendee list and particular interests of a user. As shown in FIG. 9A, assume that a user of user device 210 (e.g., via profile identifier application 510) elects to capture an image of a conference attendee list by selecting a "Capture Image" button presented by profile identifier application 510. As further shown in FIG. 9B, if an electronic version of the conference attendee list is available (which, for purposes of this example, is assumed to be unavailable), the user may instead select a "Browse" button to elect to upload the electronic version of the conference attendee list.

As shown in FIG. 9B, profile identifier application 510 may cause user device 210 to capture an image of a conference attendee list 920, as indicated by reference number 925. As indicated by reference number 930, the user of user device 210 may select target people and/or information to identify from conference attendee list 920 by utilizing profile identifier application 510. The target people and/or information may include people that the user knows, target clients of the user, potential recruits of the user, vendors of the user, or the like. As further shown in FIG. 9B, user device 210 may provide conference attendee list 920 to profile identifier platform 220, as indicated by reference number 940, and may provide the target people and/or information to profile identifier platform 220, as indicated by reference number 950. In some implementations, the target people and/or information may be obtained from local memory of user device 210.

As shown in FIG. 9C, profile identifier platform 220 may identify biographies for the target people and/or information based on conference attendee list 920, as indicated by reference number 960. For example, profile identifier platform 220 may perform an OCR on conference attendee list 920 to determine names of people attending the conference. Profile identifier platform 220 may compare the determined names to names stored in index 750 (FIG. 7) in order to identify names of people attending the conference that match names stored in index 750. After identifying the matching names, profile identifier platform 220 may compare the matching names with names associated with the target people and/or information. If a target person's name and/or information matches one of the matching names, profile identifier platform 220 may identify profile information for the target person, and may generate a biography for the target person in accordance with the configuration information (as described above in connection with FIGS. 4-5C).

For example, assume that the user is a lawyer attending a legal conference. In such an example, the lawyer may wish to receive biographies for people attending the legal conference that are known by the lawyer, people attending the legal conference from one of the lawyer's target clients, a partner of another law firm with whom the lawyer could share best practice tips, and non-partners from other law firms that the lawyer may want to recruit as an employee.

As further shown in FIG. 9C, profile identifier platform 220 may provide biographies for the target people and/or information to user device 210, as indicated by reference number 970. User device 210 may receive the biographies, and may display the biographies in different categories, such as people known to the user, target clients, potential recruits, or the like. For example, user device 210 may display a biography associated with Bob Smith of ABC Corp. (e.g., who is a former co-worker of the user), a biography associated with David Kahn of ZYX Corp. (e.g., who is a friend of the user), or the like.

As indicated above, FIGS. 9A-9C are provided merely as an example. Other examples are possible and may differ from what was described with regard to FIGS. 9A-9C. In some implementations, the various operations described in connection with FIGS. 9A-9C may be performed automatically (without user input) or at the request of a user.

Figure 10A:
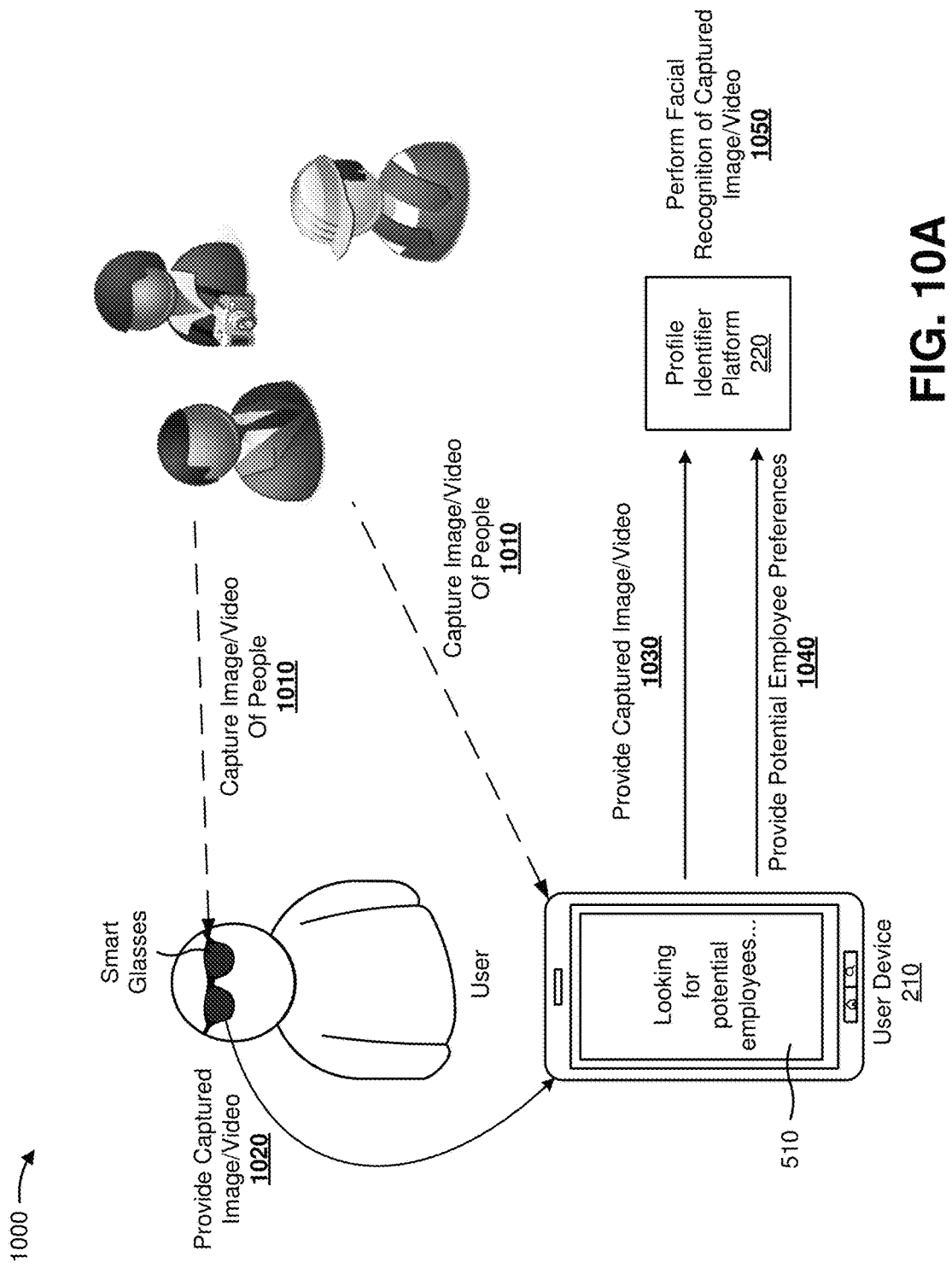
FIGS. 10A and 10B are diagrams of an example implementation for identifying potential employees based on captured information.
Figure 10B:
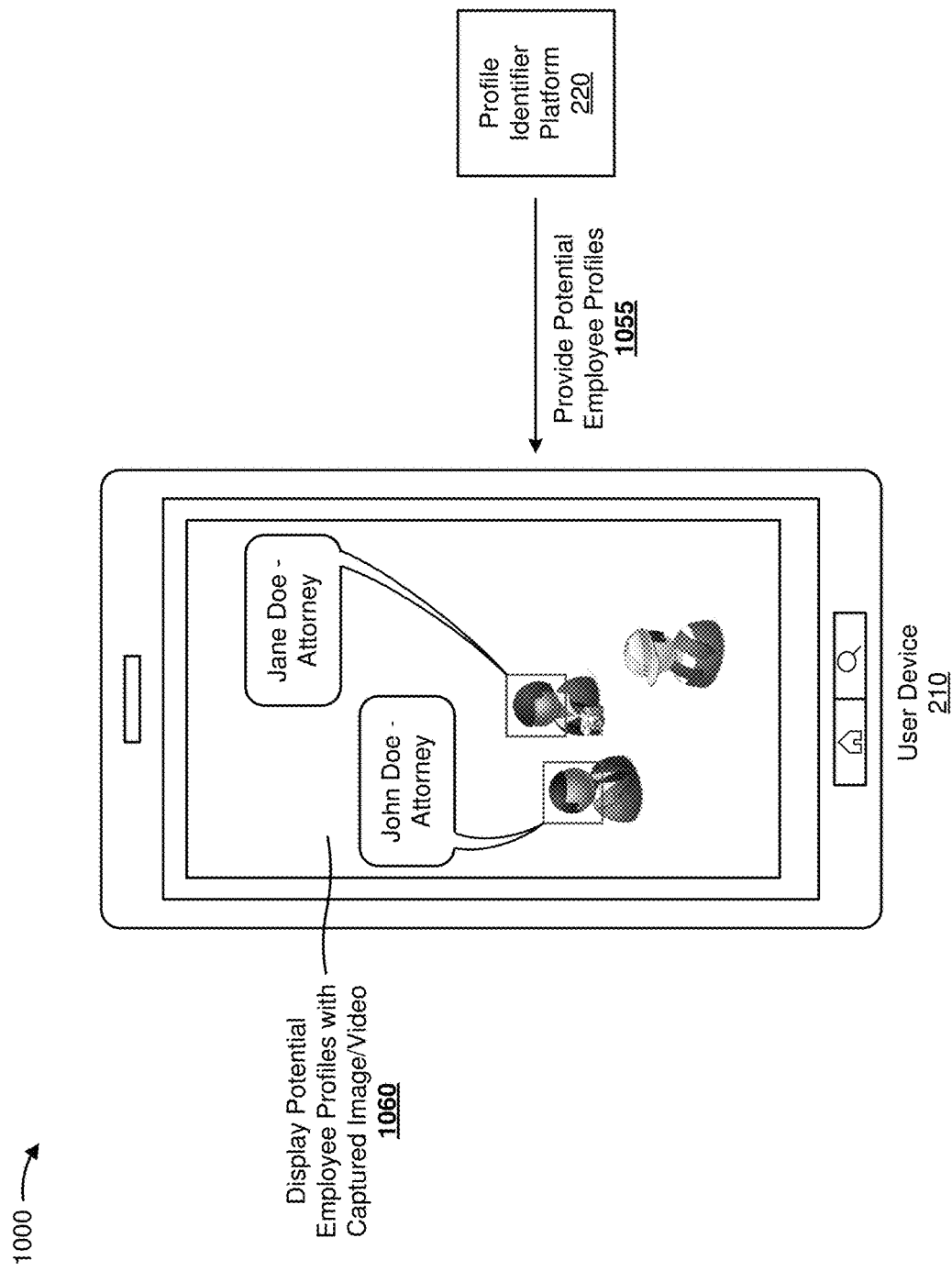

FIGS. 10A and 10B are diagrams of an example implementation 1000 for identifying potential employees based captured information. As shown in FIG. 10A, assume that a user of user device 210 utilizes profile identifier application 510 to look for potential employees. For example, the user may specify positions, required degrees, experience, or the like, as preferences for the potential employees. Further assume that the user wears a pair of smart glasses that captures images and/or video of people, as indicated by reference number 1010. Alternatively, or additionally, user device 210 may capture images/video of people, as further indicated by reference number 1010. As further shown in FIG. 10A, the smart glasses may provide the captured image/video to user device 210, as indicated by reference number 1020. User device 210 may provide the captured image/video to profile identifier platform 220, as indicated by reference number 1030, and may provide the potential employee preferences to profile identifier platform 220, as indicated by reference number 1040. Profile identifier platform 220 may perform facial recognition of the captured image/video, as indicated by reference number 1050, and may compare results of the facial recognition to information in index 750 (FIG. 7).

Assume that profile identifier platform 220 identifies stored images of people, which match the people in the captured image/video, based on the comparison. However, further assume that profile identifier platform 220 determines that only two of the matching people (e.g., John Doe and Jane Doe) satisfy the potential employee preferences. As shown in FIG. 10B, profile identifier platform 220 may determine profile information (e.g., names (John Doe and Jane Doe) and titles (Attorneys)) that correspond to the identified stored images. As indicated by reference number 1055, profile identifier platform 220 may provide the potential employee profiles to user device 210. User device 210 may receive and display the potential employee profiles with the captured image/image, as indicated by reference number 1060. For example, user device 210 may display profile information, associated with Jane Doe, Attorney and John Doe, Attorney, with the captured image of Jane Doe and John Doe, respectively.

In some implementations, the smart glasses and profile identifier platform 220 may be utilized in an augmented or virtual reality environment. For example, the smart glasses may display the live captured image/video of Jane Doe and John Doe, and may augment or supplement the live captured image/video with the profile information, as shown in FIG. 10B.

In some implementations, the user may instruct user device 210 to provide available positions at the user's organization to profile identifier platform 220. In such implementations, profile identifier platform 220 may utilize analytics (e.g., looking at social media profiles to determine who might be a potential employee) to identify candidates for the user. For example, profile identifier platform 220 may identify a person that changes jobs every three years and has been at a current job for almost three years, may identify a person at a company that is going through layoffs and could be great target employee, may identify a person who is obtaining a particular degree and the user's organization has a program that pays for such degrees, or the like.

As indicated above, FIGS. 10A and 10B are provided merely as an example. Other examples are possible and may differ from what was described with regard to FIGS. 10A and 10B. In some implementations, the various operations described in connection with FIGS. 10A and 10B may be performed automatically (without user input) or at the request of a user.

Figure 11A:
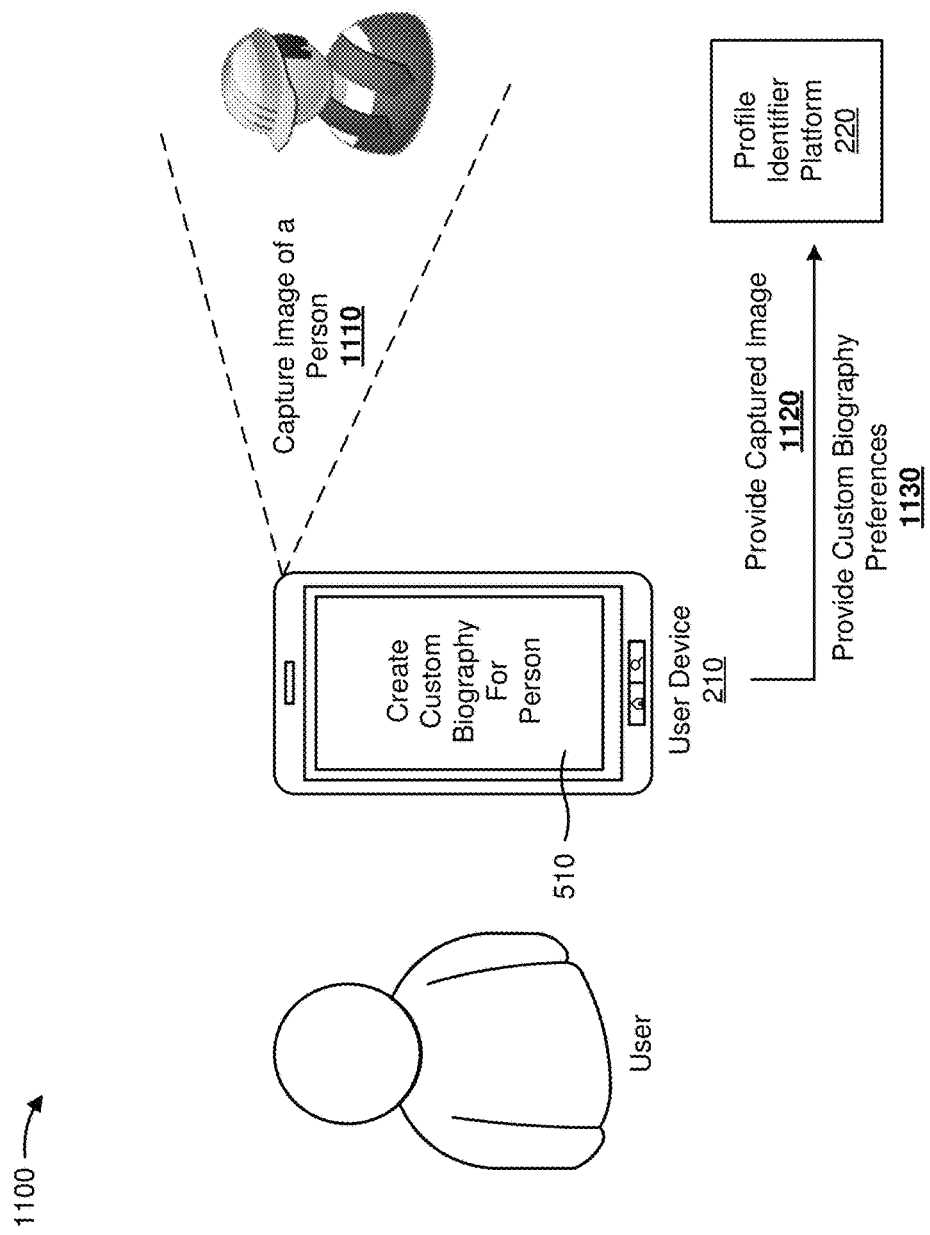
FIGS. 11A and 11B are diagrams of an example implementation for creating a custom biography of a person based on captured information associated with the person.
Figure 11B:
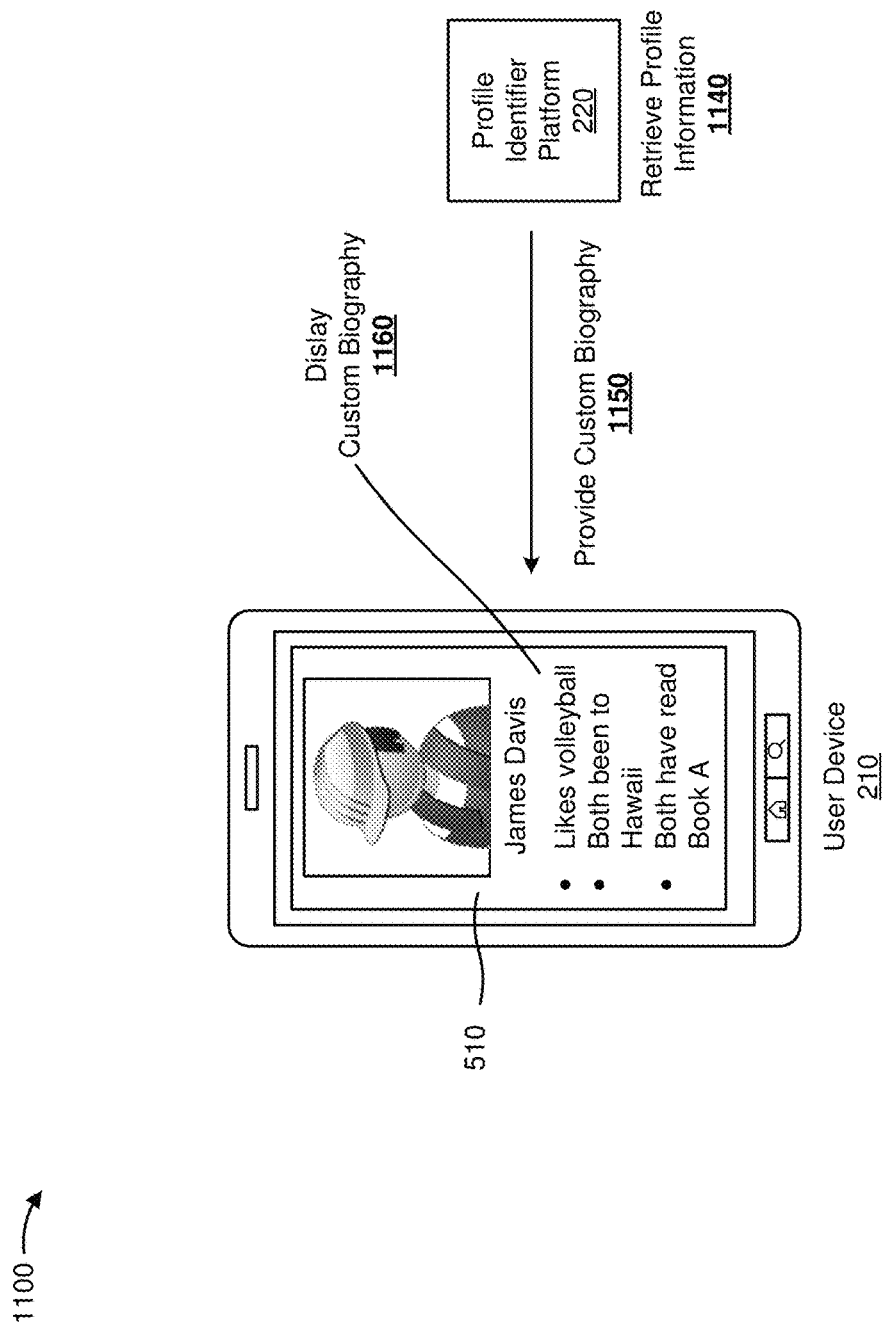

FIGS. 11A and 11B are diagrams of an example implementation 1100 for creating a custom biography of a person based on captured information associated with the person. As shown in FIG. 11A, assume that a user of user device 210 wishes to utilize profile identifier application 510 to create a custom biography for a person. For example, assume that the user is looking for ice breaker information for the person, and specifies custom biography preferences that will provide such information (e.g., whether the user and the person have worked at the same place before, whether the user and the person went to the same college, whether the user and the person know some of the same people, whether the user and the person have things in common, such as we both like to run or we both went to Hawaii, etc.). As further shown in FIG. 11A, user device 210 may capture an image of the person, as indicated by reference number 1110. User device 210 may provide the captured image to profile identifier platform 220, as indicated by reference number 1120, and may provide the custom biography preferences to profile identifier platform 220, as indicated by reference number 1130.

Profile identifier platform 220 may perform facial recognition of the captured image, and may compare results of the facial recognition to information in index 750 (FIG. 7). Assume that profile identifier platform 220 identifies a stored image of the person (e.g., James Davis), which matches the person in the captured image, based on the comparison. As shown in FIG. 11B, profile identifier platform 220 may determine and obtain profile information that corresponds to the identified stored image, as indicated by reference number 1140. Profile identifier platform 220 may customize the profile information, to create a custom biography for the person, based on the custom biography preferences. As further shown in FIG. 11B, profile identifier platform 220 may provide the custom biography to user device 210, as indicated by reference number 1150, and user device 210 may display the custom biography with the captured image, as indicated by reference number 1160. For example, the custom biography may include a biography, for James Davis, which indicates that he likes volleyball, that he has been to Hawaii, and that he has read Book A.

As indicated above, FIGS. 11A and 11B are provided merely as an example. Other examples are possible and may differ from what was described with regard to FIGS. 11A and 11B. In some implementations, the various operations described in connection with FIGS. 11A and 11B may be performed automatically (without user input) or at the request of a user.

Figure 12:
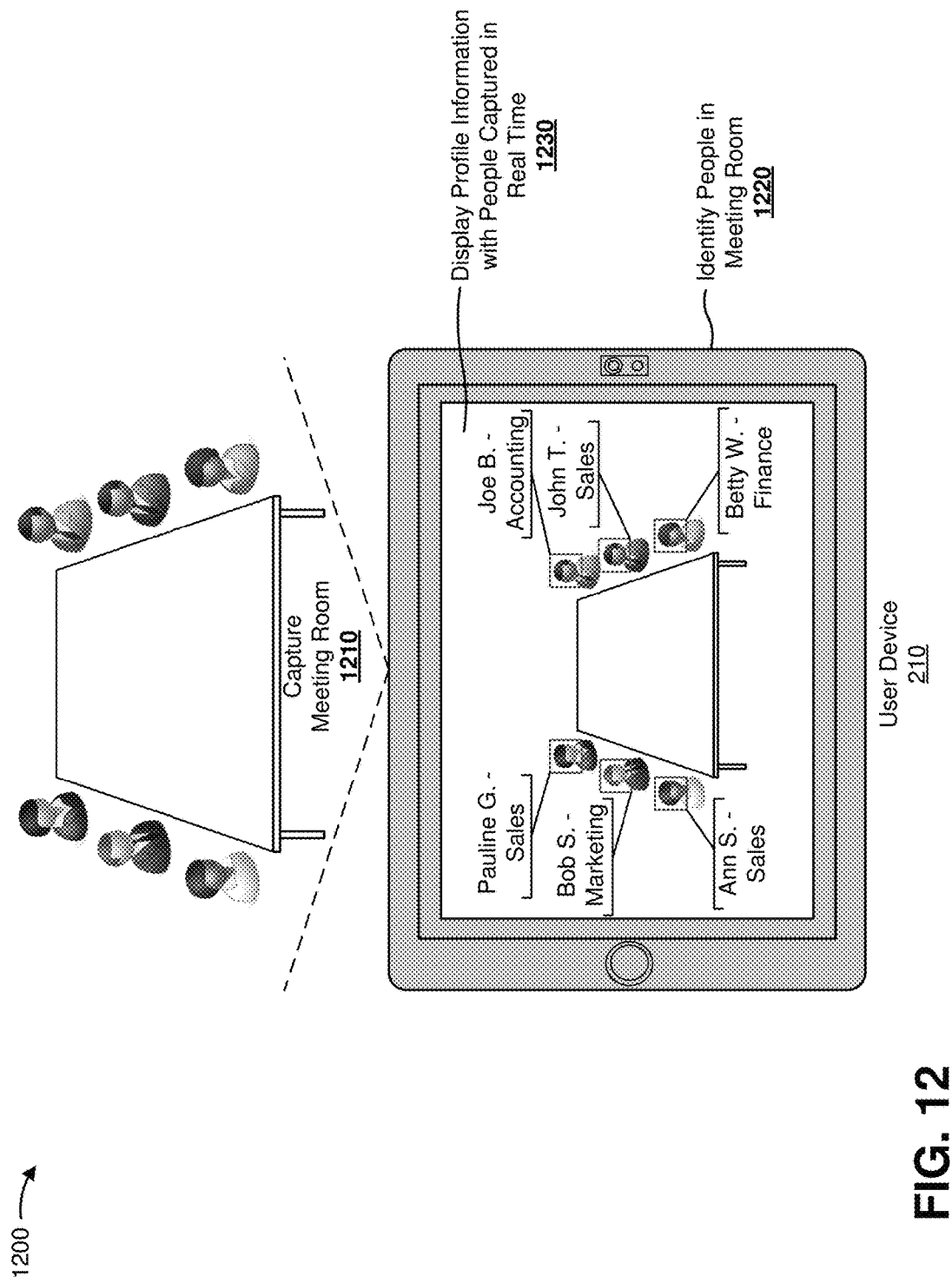
FIG. 12 is a diagram of an example implementation for creating a virtual image and/or video that includes a captured image and/or video and identified profile information.

FIG. 12 is a diagram of an example implementation 1200 for creating a virtual image and/or video that includes a captured image/video and identified profile information. As shown in FIG. 12, user device 210 may capture an image/video of a meeting room of people, as indicated by reference number 1210, and may provide the captured image/video to profile identifier platform 220 (not shown). In some implementations, user device 210 may identify profile information (e.g., names and positions) for one or more people in the captured image/video based on contacts and/or images stored in user device 210, as indicated by reference number 1220. Additionally, or alternatively, profile identifier platform 220 may identify profile information (e.g., names and positions) for each person in the captured image/video (or for people not identified by user device 210), and may provide the profile information to user device 210. As further shown in FIG. 12, user device 210 may display the profile information with the people, as image/video of the people is being captured in real time. Displaying the profile information overlaid on an image/video of the people in real time may enable the user to pan a room with a camera of user device 210, and profile information may change as images/videos of different people are captured by the camera.

In some implementations, user device 210 and profile identifier platform 220 may be utilized in an augmented or virtual reality environment. For example, the images/videos captured by user device 210, and analyzed by profile identifier platform 220, may be presented as a live direct or indirect view of a physical, real-world meeting room, with elements that are augmented (or supplemented) by computer-generated sensory input, such as sound, video, images, graphics, the captured information, or the like.

As indicated above, FIG. 12 is provided merely as an example. Other examples are possible and may differ from what was described with regard to FIG. 12. In some implementations, the various operations described in connection with FIG. 12 may be performed automatically (without user input) or at the request of a user.

In systems and/or methods described herein, a user device may capture an image and/or video of a person, may identify profile information for the person based on facial recognition of the captured image/video, and may present the profile information on the user device. The profile information may be utilized to identify the person in the captured image/video and/or to create a custom profile of the person for storage in and display by the user device.

By capturing images/video of people in this way, the user device quickly and easily provides profile information to the user of the user device about people that the user may know, about people that the user does not know, about people from target clients of the user, about people at that the user may wish to employ, or the like. The profile information may be used to connect with people via social media, to connect with people at a conference or a meeting, to provide ice breaker information for people, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include items, and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
store images of people and profile information associated with the images of the people;
generate configuration information associated with providing customized profile information to a user device,
the configuration information being generated based on preferences, received from the user device, that specify information to be provided in the customized profile information,
the preferences including information identifying biography information about the people to include in the customized profile information;
receive an image, of a person, captured by the user device;
perform facial recognition of the image of the person to generate facial features of the person;
compare the facial features of the person and the images of the people;
identify a stored image of the person, from the images of the people, based on comparing the facial features of the person and the images of the people;
determine, from the profile information associated with the images of the people, particular profile information that corresponds to the stored image of the person,
the particular profile information being determined based on the configuration information; and
provide the particular profile information to the user device.

2. The device of claim 1, where the one or more processors are further to:
receive the images of the people and the profile information associated with the images of the people from one or more social media devices.

3. The device of claim 1, where the one or more processors are further to:
receive, from the user device, information identifying the preferences associated with the configuration information;
generate the configuration information based on the information identifying the preferences; and
provide the configuration information to the user device.

4. The device of claim 1, where the one or more processors, when identifying the stored image of the person, are to:
identify a plurality of stored images, from the images of the people, based on comparing the facial features of the person to the images of the people;
determine scores for the plurality of stored images based on comparing the facial features of the person to the plurality of stored images; and
select one of the plurality of stored images, as the stored image of the person, based on the scores for the plurality of stored images.

5. The device of claim 1, where the image of the person includes a frame of a video captured by the user device.

6. A non-transitory computer-readable medium storing instructions, the instructions comprising:
one or more instructions that, when executed by one or more processors, cause the one or more processors to:
generate configuration information associated with providing customized profile information to a user device,
the configuration information being generated based on preferences, received from the user device, that specify information to be provided in the customized profile information;
receive a video, of a person, obtained by the user device;
perform facial recognition on the video of the person to identify facial features of the person;
compare the facial features of the person and stored images of people;
identify a stored image of the person, from the stored images of the people, based on comparing the facial features of the person and the stored images of the people;
determine, from profile information associated with the stored images of the people, particular profile information that corresponds to the stored image of the person,
the particular profile information being determined based on the configuration information, and
the particular profile information including information identifying biography information about the person; and
provide the particular profile information to the user device,
the particular profile information causing the user device to display the particular profile information with the video of the person or a frame of the video of the person.

7. The non-transitory computer-readable medium of claim 6, where the stored images of the people and the profile information associated with the stored images of the people are received from one or more social media devices.

8. The non-transitory computer-readable medium of claim 6, where the instructions further comprise:
one or more instructions that, when executed by the one or more processors, cause the one or more processors to:
receive, from the user device, information identifying the preferences associated with the configuration information;
generate the configuration information based on the information identifying the preferences; and
provide the configuration information to the user device.

9. The non-transitory computer-readable medium of claim 6, where the instructions further comprise:
one or more instructions that, when executed by the one or more processors, cause the one or more processors to:
identify a plurality of stored images, from the stored images of the people, based on comparing the facial features of the person and the stored images of the people;
determine scores for the plurality of stored images based on comparing the facial features of the person and the plurality of stored images; and select one of the plurality of stored images, as the stored image of the person, based on the scores for the plurality of stored images.

10. The non-transitory computer-readable medium of claim 6, where the video of the person includes a plurality of frames obtained by the user device.

11. A method, comprising:
generating, by a device, configuration information associated with providing customized profile information to a user device,
the configuration information being generated based on preferences, received from the user device, that specify information to be provided in the customized profile information;
receiving, by the device, an image, of a person, captured by the user device;
performing, by the device, facial recognition of the image of the person to identify facial features of the person;
comparing, by the device, the facial features of the person and stored images of people;
identifying, by the device, a stored image of the person, from the stored images of the people, based on comparing the facial features of the person and the stored images of the people;
determining, by the device and from profile information associated with the stored images of the people, particular profile information that corresponds to the stored image of the person,
the particular profile information being determined based on the configuration information, and
the particular profile information identifying biography information about the person; and
providing, by the device, the particular profile information to the user device.

12. The method of claim 11, where the stored images of the people and the profile information associated with the stored images of the people are received from one or more social media devices.

13. The method of claim 11, further comprising:
receiving, from the user device, information identifying the preferences associated with the configuration information;
generating the configuration information based on the information identifying the preferences; and
providing the configuration information to the user device.

14. The method of claim 11, further comprising:
identifying a plurality of stored images, from the stored images of the people, based on comparing the facial features of the person and the stored images of the people;
determining scores for the plurality of stored images based on comparing the facial features of the person and the plurality of stored images; and
selecting one of the plurality of stored images, as the stored image of the person, based on the scores for the plurality of stored images.

15. A user device, comprising:
one or more processors to:
initiate a configuration of a profile identifier application associated with a device;
provide, to the device and based on initiating the configuration of the profile identifier application, preferences that specify information to be provided in customized profile information generated by the device;
receive, from the device and based on providing the preferences, configuration information associated with the customized profile information;
configure the profile identifier application based on the configuration information;
receive an image of a person;
provide, based on the profile identifier application, the image of the person to the device to cause the device to identify a stored image of the person, from stored images of people, based on comparing facial features of the person and the stored images of the people, and determine particular profile information that corresponds to the stored image of the person,
the particular profile information to be determined based on the configuration information;
receive the particular profile information from the device; and
provide the particular profile information for display.

16. The user device of claim 15, where the one or more processors, when providing the particular profile information for display, are to:
provide the particular profile information for display as an overlay on the image of the person.

17. The user device of claim 15, where the one or more processors are further to:
receive the profile identifier application from the device based on a request for the profile identifier application,
the profile identifier application causing the user device to provide the image of the person to the device; and
where the one or more processors, when initiating the configuration of the profile identifier application associated with the device, are to:
initiate the configuration of the profile identifier application based on receiving the profile identifier application.

18. The user device of claim 15, where the image of the person includes a frame of a video received by the user device.

19. The user device of claim 15, where the preferences include:
information identifying an event associated with the person,
information identifying a method for capturing information associated with the person,
information identifying biography information about the person to include in the customized profile information,
information identifying sources of the biography information about the person, and
information identifying a target category associated with the person.

20. The user device of claim 15, where the one or more processors, when receiving the image of the person, are to:
receive the image of the person from a wearable device associated with the user device.

* * * * *